US010376009B2

(12) United States Patent
Kennedy et al.

(10) Patent No.: US 10,376,009 B2
(45) Date of Patent: Aug. 13, 2019

(54) IMPACT PROTECTION AND SHOCK ABSORBING SYSTEM AND METHOD

(71) Applicants: Emily B. Kennedy, Cleveland, OH (US); Daphne C. Fecheyr-Lippens, Ghent (BE); Bor-Kai Hsiung, Akron, OH (US); Douglas J. Paige, Lakewood, OH (US); Nathan B. Swift, Cleveland, OH (US)

(72) Inventors: Emily B. Kennedy, Cleveland, OH (US); Daphne C. Fecheyr-Lippens, Ghent (BE); Bor-Kai Hsiung, Akron, OH (US); Douglas J. Paige, Lakewood, OH (US); Nathan B. Swift, Cleveland, OH (US)

(73) Assignee: The University of Akron, Akron, OH (US)

( * ) Notice: Subject to any disclaimer, the term of this patent is extended or adjusted under 35 U.S.C. 154(b) by 137 days.

(21) Appl. No.: 15/636,975

(22) Filed: Jun. 29, 2017

(65) Prior Publication Data
US 2017/0295880 A1 Oct. 19, 2017

Related U.S. Application Data

(63) Continuation-in-part of application No. PCT/US2016/052760, filed on Sep. 21, 2016.
(Continued)

(51) Int. Cl.
*F16F 1/373* (2006.01)
*A42B 3/06* (2006.01)
(Continued)

(52) U.S. Cl.
CPC .............. *A42B 3/064* (2013.01); *A42B 3/12* (2013.01); *F16F 1/373* (2013.01); *F16F 1/54* (2013.01);
(Continued)

(58) Field of Classification Search
CPC .............. A41D 13/015; A41D 13/0587; A63B 2209/00; A63B 71/12; A63B 71/10;
(Continued)

(56) References Cited

U.S. PATENT DOCUMENTS 3,856,615 A * 12/1974 Dreher .................... B60R 19/18
267/140
4,307,471 A  12/1981 Lovell
(Continued)

FOREIGN PATENT DOCUMENTS

WO  2015069800 A2  5/2015

OTHER PUBLICATIONS

Julian F. V. Vincent, "Survival of the cheapest", materialstoday journal, Dec. 2002, pp. 28-41, Elsevier Science Ltd.
(Continued)

*Primary Examiner* — Robert H Muromoto, Jr.
(74) *Attorney, Agent, or Firm* — Renner Kenner Greive Bobak Taylor and Weber

(57) ABSTRACT

An impact protection and shock absorbing device includes a support surface, and a plurality of flexible spines, configured of one or more sizes, each having a length defined from a base portion at the support surface to a distal portion thereof, and whereby each spine extends in one or more longitudinal directions outwardly from the support surface, at one or more angles less than 90 degrees. Sufficient deflecting of one or more spines by impact force causes impinging and deflecting of one or more other spines thereby dispersing and reducing impact forces.

26 Claims, 14 Drawing Sheets

Related U.S. Application Data

(60) Provisional application No. 62/221,783, filed on Sep. 22, 2015, provisional application No. 62/356,243, filed on Jun. 29, 2016.

(51) Int. Cl.
    *A42B 3/12*    (2006.01)
    *F16F 1/54*    (2006.01)
    *F16F 3/087*   (2006.01)
    *F16F 15/08*   (2006.01)
    *B32B 1/00*    (2006.01)

(52) U.S. Cl.
    CPC .............. *F16F 3/087* (2013.01); *F16F 15/08* (2013.01); *A42B 3/062* (2013.01)

(58) Field of Classification Search
    CPC .... A42B 3/04; A42B 3/125; F16F 2224/0233; F16F 7/123; F16F 9/0472
    See application file for complete search history.

(56) References Cited

U.S. PATENT DOCUMENTS

| | | | |
|---|---|---|---|
| 4,645,375 A * | 2/1987 | Carney, III | E01F 15/146 188/377 |
| 6,293,727 B1 * | 9/2001 | Albritton | B60R 19/00 256/13.1 |
| 6,381,876 B2 * | 5/2002 | Krajcir | A43B 7/32 36/72 R |
| 9,101,171 B2 * | 8/2015 | Brandt | A41D 13/015 |
| 9,538,813 B1 * | 1/2017 | Schwank | A43B 17/026 |
| 2007/0068755 A1 | 3/2007 | Hawkins et al. | |
| 2013/0000015 A1 | 1/2013 | Marzec et al. | |
| 2013/0122256 A1 | 5/2013 | Kleiven et al. | |
| 2013/0185837 A1 | 7/2013 | Phipps et al. | |
| 2014/0259323 A1 * | 9/2014 | Brandt | A41D 13/015 2/455 |
| 2015/0089723 A1 * | 4/2015 | Jean | A42B 3/085 2/414 |
| 2017/0347742 A1 * | 12/2017 | Turner | A42B 3/125 |
| 2018/0274620 A1 * | 9/2018 | Lamson | A42B 3/04 |
| 2018/0345651 A1 * | 12/2018 | Polit Casillas | B41F 15/0831 |

OTHER PUBLICATIONS

J.F.V. Vincent, et al., "Mechanical design of hedgehog spines and porcupine quills", The Zoological Soceity of London, 1986, pp. 55-75, issue 210.

Nathan B. Swift, et al., "Dynamic impact testing of hedgehog spines using a dual-arm crash pendulum", Journal of the Mechanical Behavior of Biomedical Materials, 2016, pp. 271-282, issue 61.

G.N. Karam, et al., "Biomimicking of animal quills and plant stems: natural cylindrical shells with foam cores", Materials Science and Engineering journal, 1994, pp. 113-132.

* cited by examiner

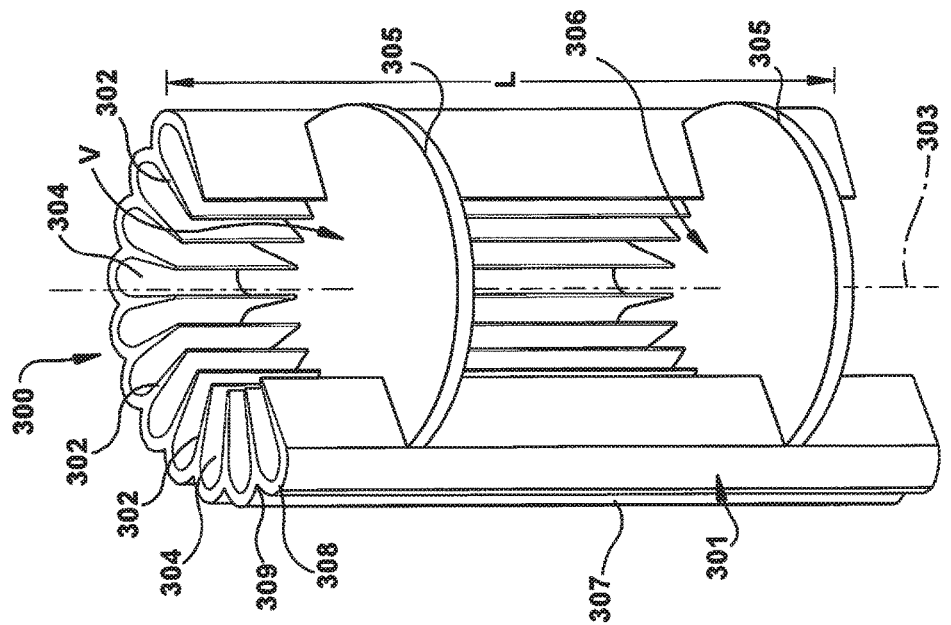
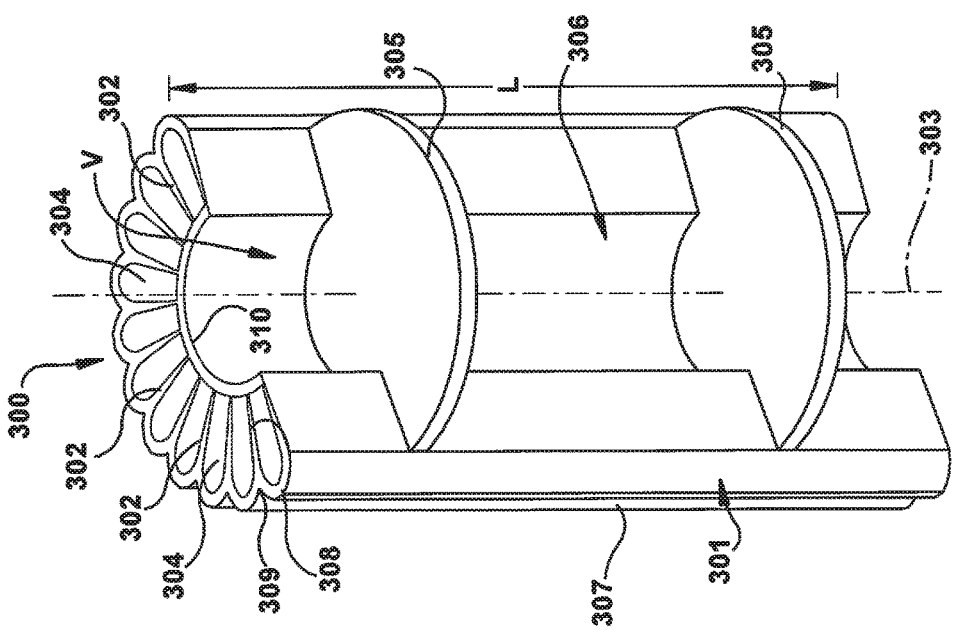

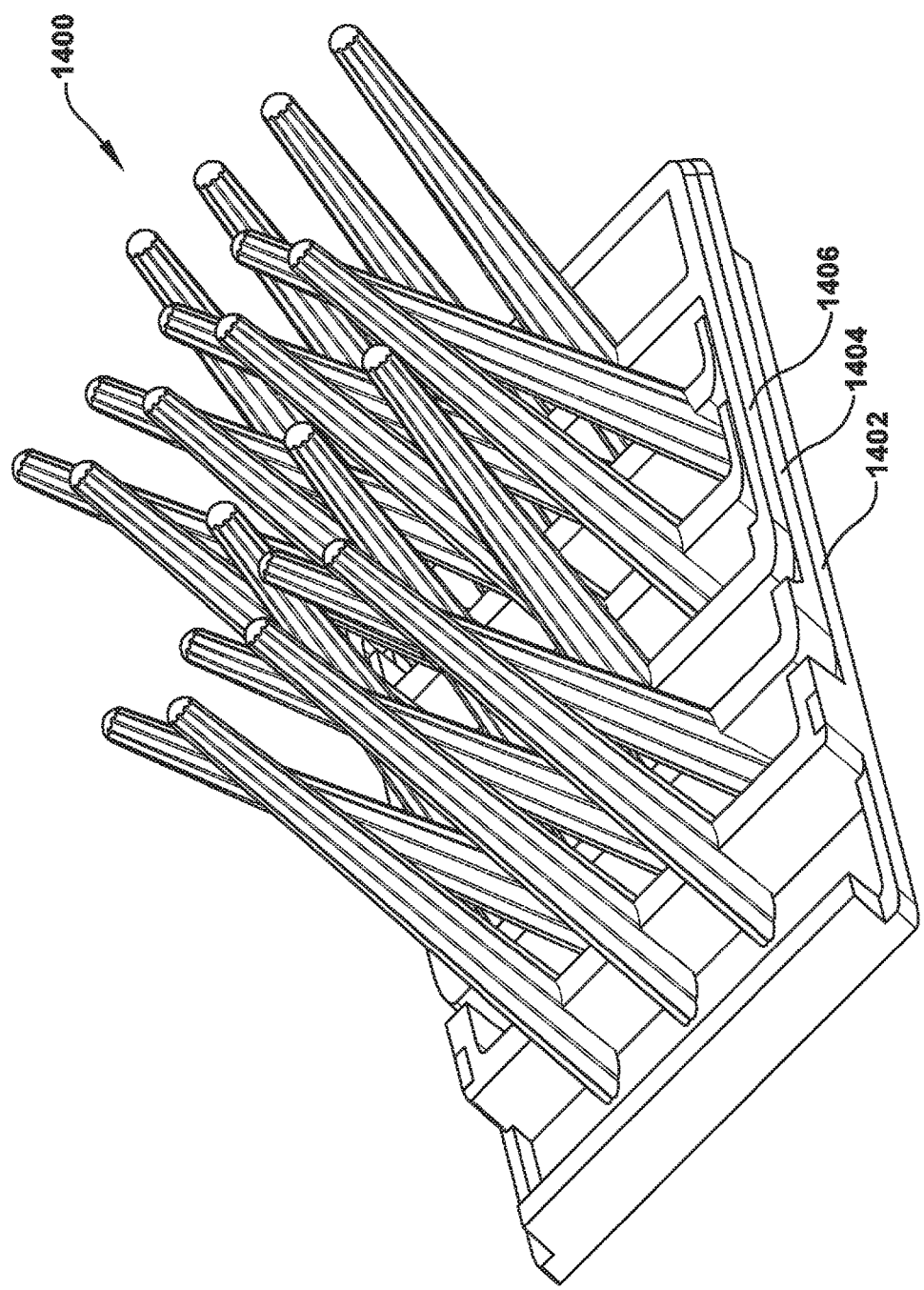

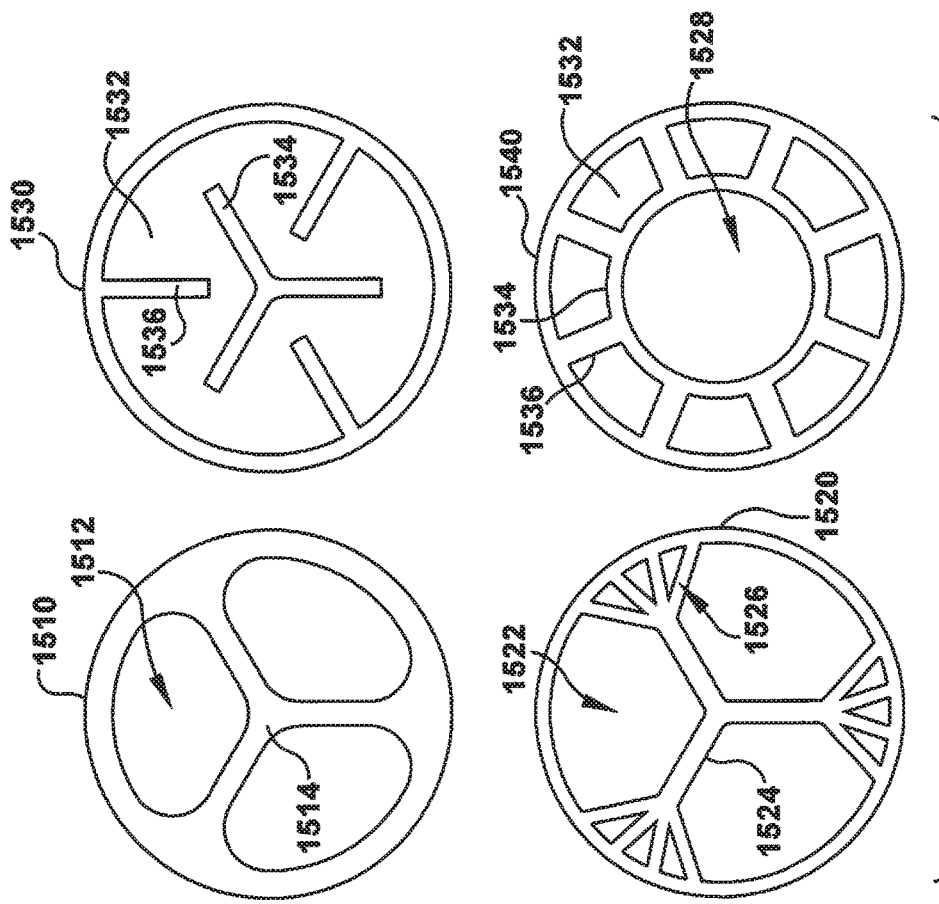
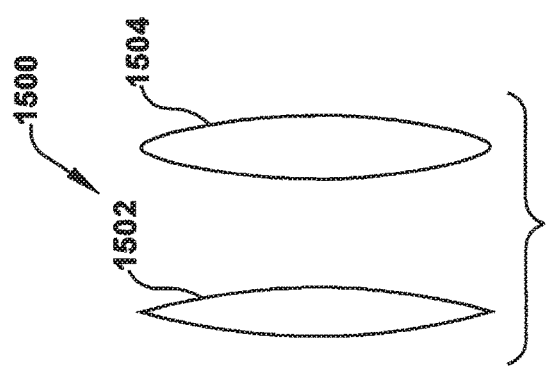

IMPACT PROTECTION AND SHOCK ABSORBING SYSTEM AND METHOD

CROSS-REFERENCE TO RELATED APPLICATIONS

This application is a continuation-in-part of PCT/US16/52760, filed Sep. 21, 2016, which claims the benefit of U.S. provisional patent application Ser. No. 62/221,783, filed Sep. 22, 2015, both of which are incorporated by reference in their entirety, and also claims the benefit of U.S. provisional patent application Ser. No. 62/356,243, filed Jun. 29, 2016, which is incorporated herein by reference in its entirety.

FIELD

The present application generally relates to an impact protection and shock-absorbing device comprising a plurality of flexible spines extending from a support surface which interact with one another upon a sufficient compressive and/or shear force to absorb and disperse the force through deflection and impingement.

BACKGROUND

A concussion is a mild form of a traumatic brain injury (TBI). One in ten football players is diagnosed with a concussion each season and actual rate of concussion is much higher as an estimated five of six concussions go undiagnosed. Cumulative concussions increase the likelihood of permanent neurological disability by 39 percent.

Today's top-of-the-line football helmets are fitted with safety liners consisting of foam, compressible plastic modules, air filled chambers, or slip plane technologies. Present commercialized solutions have two major shortcomings. First, they do not adequately protect against angular acceleration, despite a strong consensus among researchers that sufficient angular acceleration is apt to result in a concussion. Second, most lack multi-hit durability. Foam rapidly loses its spring-back capability, air filled chambers constantly lose pressure, and slip plane technologies may frictionally degrade underlying layers.

Therefore, there is a need in the art for an impact protection and shock-absorbing device which does not have all of the shortfalls of current solutions and which incorporates a design to improve absorption and dispersion of compressive and/or shear forces.

SUMMARY

In a first example embodiment, the present application provides an impact protection and shock absorbing device comprising a support surface; a first plurality of flexible spines, having one or more lengths defined from a base end to a distal end thereof, and each extending in one or more longitudinal directions upwardly from said support surface, from said base end to said distal end, at one or more angles less than 90 degrees. Said longitudinal directions may result in parallel spines and/or spines at one or more degrees transverse to others such that upon impact, spines deflect and adjacent spines continue to be impinged at one or more locations along their lengths, thereby absorbing and dispersing compressive and/or shear forces. Each of said first plurality of flexible spines creates an overhang over said support surface; and second plurality of flexible spines, each having a length defined from a base end to a distal end thereof, and each extending upwardly from said support surface from said base end to said distal end at an angle less than 90 degrees such that each of said second plurality of flexible spines creates an overhang over said support surface, and each of said second plurality of spines extends such that each of said second plurality of flexible spines extends under the overhang created by a respective neighboring one of said first plurality of flexible spines, whereby, upon sufficient compression of said first plurality of flexible spines in a downward direction toward said support surface, said first plurality of flexible spines contacts said second plurality of flexible spines and are absorbed thereby.

In a second example embodiment, the present application provides an impact protection device as in the first embodiment, further comprising a third plurality of flexible spines, each having a length defined from a base end to a distal end thereof, and each extending upwardly from said support surface from said base end to said distal end at an angle less than 90 degrees such that each of said third plurality of flexible spines creates an overhang over said support surface, each of said third plurality of flexible spines extends such that each of said third plurality of flexible spines extends under the overhang created by a respective neighboring one of said first plurality of flexible spines and the overhang created by a respective neighboring one of said second plurality of flexible spines, whereby, upon sufficient compression of said first plurality of flexible spines in a downward direction toward said support surface, a respective one of said first plurality of flexible spines contacts a respective neighboring one of said second plurality of flexible spines and said one of said second plurality of flexible spines contacts a respective neighboring one of said third plurality of flexible spines and compressive forces and/or shear forces are absorbed thereby.

In a third example embodiment, the present application provides an impact protection device as in either the first or second embodiment, wherein each of said second plurality of flexible spines extends parallel relative to said longitudinal direction of said first plurality of flexible spines, and each of said third plurality of flexible spines extends parallel relative to said longitudinal direction of said first plurality of flexible spines.

In a fourth example embodiment, the present application provides an impact protection device as in any of the first through third embodiments, wherein each of said second plurality of flexible spines extends at a positively transverse angle relative to said longitudinal direction of said first plurality of flexible spines, and each of said third plurality of flexible spines extends at a negatively transverse angle relative to said longitudinal direction of said first plurality of flexible spines.

In a fifth example embodiment, the present application provides an impact protection device as in any of the first through fourth embodiments, wherein an angle of 0 degrees is defined as the longitudinal direction of said first plurality of flexible spines and wherein each of said second plurality of flexible spines extends between about 10 and 60 degrees and each of said third plurality of flexible spines extends between about −10 and about −60 degrees.

In a sixth example embodiment, the present application provides an impact protection device as in any of the first through fifth embodiments, wherein each of said second plurality of flexible spines extends at a negatively transverse angle relative to said longitudinal direction of said first plurality of flexible spines, and each of said third plurality of flexible spines extends at a positively transverse angle relative to said longitudinal direction of said first plurality of flexible spines.

In a seventh example embodiment, the present application provides an impact protection device as in any of the first through sixth embodiments, wherein an angle of 0 degrees is defined as the longitudinal direction of said first plurality of flexible spines and wherein each of said second plurality of flexible spines extends between about −10 and −60 degrees and each of said third plurality of flexible spines extends between about 10 and about 60 degrees.

In an eighth example embodiment, the present application provides an impact protection device as in any of the first through seventh embodiments, wherein a row of said first plurality of flexible spines is aligned in a first row extending in a transverse direction of said longitudinal direction.

In a ninth example embodiment, the present application provides an impact protection device as in any of the first through eighth embodiments, wherein a row of said second plurality of flexible spines is aligned in a second row extending in a transverse direction of said longitudinal direction and spaced apart from the first row in said longitudinal direction.

In a tenth example embodiment, the present application provides an impact protection device as in any of the first through ninth embodiments, wherein a row of said third plurality of flexible spines is aligned in a third row extending in a transverse direction of said longitudinal direction and spaced apart from both said first row and second row in said longitudinal direction.

In an eleventh example embodiment, the present application provides an impact protection device as in any of the first through tenth embodiments, wherein the support surface defines a plane and equates to an angle of 0 degrees and each of the first plurality of flexible spines extends at an angle between about 30 degrees to about 80 degrees.

In a twelfth example embodiment, the present application provides an impact protection device as in any of the first through eleventh embodiments, wherein the support surface defines a plane and equates to an angle of 0 degrees and each of the second plurality of flexible spines extends at an angle between about 30 degrees to about 80 degrees.

In a thirteenth example embodiment, the present application provides an impact protection device as in any of the first through twelfth embodiments, wherein the support surface defines a plane and equates to an angle of 0 degrees and each of the third plurality of flexible spines extends at an angle between about 30 degrees to about 80 degrees.

In a fourteenth example embodiment, the present application provides an impact protection device as in any of the first through thirteenth embodiments, wherein the spines from the first plurality, the second plurality, and the third plurality have shapes selected from the group consisting of a uniform shape from its base to its distal end, a base that is wider than its distal end, a base that is narrower than its distal end, or combinations thereof.

In a fifteenth example embodiment, the present application provides an impact protection device as in any of the first through fourteenth embodiments, wherein the bases of the spines from the first plurality, the second plurality, and the third plurality are connected to the support surface with either a fixed connection, a flexible connection, or a combination thereof.

In a sixteenth example embodiment, the present application provides an impact protection device as in any of the first through fifteenth embodiments, wherein the device further comprises a second support surface and wherein the distal ends of each of the first plurality of spines, the second plurality of spines, and the third plurality of spines are either each connected to the second support surface, are each in contact with the second surface, or a combination thereof.

In a seventeenth example embodiment, the present application provides an impact protection device as in any of the first through sixteenth embodiments, wherein each spine of each of the first plurality of spines, the second plurality of spines, and the third plurality of spines are composed of materials selected from the group consisting of elastomeric material, polymeric material, a shape memory material, a self-healing material, or any combination thereof.

In an eighteenth example embodiment, the present application provides an impact protection device as in any of the first through seventeenth embodiments, wherein each spine of each of the first plurality of spines, the second plurality of spines, and the third plurality of spines are composed of both a hard material and a low density material.

In a nineteenth example embodiment, the present application provides an impact protection device as in any of the first through eighteenth embodiments, wherein each spine of each of the first plurality of spines, the second plurality of spines, and the third plurality of spines contain both longitudinal stiffeners and radial stiffeners, just longitudinal stiffeners and not radial stiffeners, just radial stiffeners and not longitudinal stiffeners, neither longitudinal stiffeners or radial stiffeners, or any combination thereof.

In a twentieth example embodiment, the present application provides an impact protection device as in any of the first through nineteenth embodiments, wherein each spine of each of the first plurality of spines, the second plurality of spines, and the third plurality of spines has an elastic modulus of between about 1 GPa and about 10 GPa or any combination thereof.

In a twenty-first example embodiment, the present application provides an impact protection device as in any of the first through twentieth embodiments, wherein each spine of each of the first plurality of spines, the second plurality of spines, and the third plurality of spines has a length to width ratio of between about 5:1 and about 25:1 or any combination thereof.

In a twenty-second example embodiment, the present application provides an impact protection device as in any of the first through twenty-first embodiments, wherein spines of the first plurality of spines, the spines of the second plurality of spines, and the spines of the third plurality of spines are packed on the device at between about 1 to about 100 spines per square inch, or on average between about 1 to about 100 spines per square inch.

In a twenty-third example embodiment, the present application provides a load-bearing member that includes one or more spines that have non-solid interior spaces within the spines. The non-solid interior spaces include one or more longitudinal structures that extend through at least part of the length of the spine and/or one or more radial structures that extend across at least part of the diameter of the spine.

In a twenty-fourth example embodiment, the present application provides a load-bearing member as in the twenty-third embodiment, wherein a spine includes longitudinal structures that extend along radial lines into the interior volume of the spine toward a center axial line, and terminating prior to the center axial line thereby defining channels between neighboring longitudinal structures.

In a twenty-fifth example embodiment, the present application provides a load-bearing member as in any of the twenty-third through the twenty-fourth embodiments, wherein a spine includes disc shaped radial structures within the interior volume that extend along the length of the spine.

In a twenty-sixth example embodiment, the present application provides a load-bearing member as in any of the twenty-third through the twenty-fifth embodiments, wherein the radial structures extend completely across the entirety of the interior volume without apertures or holes, thereby creating distinct chambers between neighboring radial structures.

In a twenty-seventh example embodiment, the present application provides a load-bearing member as in any of the twenty-third through the twenty-sixth embodiments, wherein the longitudinal structures extend into the interior volume toward the center axial line and have a length of between 25 to 95 percent of the radius and are positioned at from 90 to 10 radial degrees from each other.

In a twenty-eighth example embodiment, the present application provides a load-bearing member as in any of the twenty-third through the twenty-seventh embodiments, wherein the load-bearing member has a modulus of elasticity between about 1 GPa to about 10 Gpa.

In a twenty-ninth example embodiment, the present application provides a load-bearing member as in any of the twenty-third through the twenty-eighth embodiments, wherein an exterior surface of the longitudinal structure is corrugated, the corrugated surface defines ridges between neighboring longitudinal structures that form a surface of channels, and the corrugated surface defines grooves extending along the longitudinal structures.

In a thirtieth example embodiment, a method includes absorbing an impact force via deflection of spines that extend outward from a support surface, and dispersing the impact force from at least one spine to one or more adjacent spines via impingement of a spine onto one or more adjacent spines.

In a thirty-first example embodiment, an impact protection device includes a support surface and flexible spines of one or more sizes as defined by the length between the base portion at the support surface to the distal portion of the spine. The flexible spines extend in one or more longitudinal directions outwardly from the support surface at one or more angles less than 90 degrees. Deflection of one or more flexible spines by an impact force causes impingement of the spines onto one or more other flexible spines, and deflecting of those other flexible spines, thereby dispersing and reducing impact forces.

In a thirty-second example embodiment, the present application provides an impact protection device as in the thirty-first embodiment, wherein the flexible spines are configured to provide directionally enhanced impact protection and shock absorption.

In a thirty-third example embodiment, the present application provides an impact protection device as in any of the thirty-first through the thirty-second embodiments, wherein the flexible spines can be configured to provide application specific impact protection and shock absorption for sports, the positions played in a sport, a particular industry or occupation, clothing, packaging, housings for electronics or other equipment, transportation vehicles, or flooring.

In a thirty-fourth example embodiment, the present application provides an impact protection device as in any of the thirty-first through the thirty-third embodiments, wherein the bases of the flexible spines are connected to the support surface with a fixed connection, a flexible connection, or a combination of a fixed and a flexible connection.

In a thirty-fifth example embodiment, the present application provides an impact protection device as in any of the thirty-first through the thirty-fourth embodiments, wherein the impact protection device includes a second support surface and the distal ends of the flexible spines can be connected to the second support surface, or be in contact with the second support surface, or a combination thereof.

In a thirty-sixth example embodiment, the present application provides an impact protection device as in any of the thirty-first through the thirty-fifth embodiments, wherein the flexibles spines are composed of an elastomeric material, a polymeric material, a shape memory material, a self-healing material, or a combination thereof.

In a thirty-seventh example embodiment, the present application provides an impact protection device as in any of the thirty-first through the thirty-sixty embodiments, wherein one or more of the flexible spines has a non-solid interior space with an internal architecture that includes longitudinal structures extending through at least part of the length of the spine, concentric ring structures displaced within the interior space, branching structures extending through at least part of the diameter of the spine, radial structures extending through at least part of the diameter of the spine, or cavities.

In a thirty-eighth example embodiment, the present application provides an impact protection device as in any of the thirty-first through the thirty-seventh embodiments, wherein the flexible spines are solid or hollow.

In a thirty-ninth example embodiment, the present application provides an impact protection device as in any of the thirty-first through the thirty-eighth embodiments, wherein the flexible spines have an elastic modulus of between about 1 GPa and about 10 GPa.

In a fortieth example embodiment, the present application provides an impact protection device as in any of the thirty-first through the thirty-ninth embodiments, wherein the flexible spines can have a length to width ratio of between about 5:1 and about 25:1.

In a forty-first example embodiment, the present application provides an impact protection device as in any of the thirty-first through the fortieth embodiments, wherein the flexible spines can include a pointed tapered edge or a rounded tapered edge.

In a forty-second example embodiment, the present application provides an impact protection device as in any of the thirty-first through the forty-first embodiments, wherein the flexible spines can be packed on the device at a density of between about 1 to 100 spines per square inch.

In a forty-third example embodiment, the present application provides an impact protection device as in any of the thirty-first through the forty-second embodiments, wherein the flexible spines are organized into an array having flexible spines with two different orientations, three different orientations, a repeating pattern of orientations, a random pattern of orientations, or a pseudorandom pattern of orientations.

In a forty-fourth example embodiment, a protective helmet can include a hard exterior shell and a protective safety liner positioned within the hard exterior shell. The protective safety liner is configured to secure a person's head inside the protective helmet. The protective safety liner includes flexible spines configured to absorb an impact forces via deflection of spines and disperse the impact force from at least one spine to one or more adjacent spines via impingement of a spine onto one or more adjacent spines In a forty-fifth example embodiment, the present application provides a protective helmet as in the forty-fourth embodiment, wherein the protective safety liner includes a number of assembled flexible spine devices, where each of the assembled flexible spine devices provides a subset of the overall number of flexible spines in the protective safety liner.

In a forty-sixth example embodiment, the present application provides a protective helmet as in any of the forty-fourth through the forty-fifth embodiments, wherein each of the flexible spine devices can include a base flexible spine part, a center flexible spine part, and a top flexible spine part. The base flexible spine part includes a first set of flexible spines. The center flexible spine part includes a second set of flexible spines. The top flexible spine part includes a third set of flexible spines. The center flexible spine part is secured to the base flexible spine part, and the top flexible spine part is secure to the center flexible spine part.

In a forty-seventh example embodiment, the present application provides a protective helmet as in any of the forty-fourth through the forty-sixth embodiments, wherein each of the sets of flexible spines have flexible spines that are directed at different angles from the other two sets of flexible spines, and when compressed each set of flexible spines is configured to impinge upon one or both of the other two sets of flexibles spines.

In a forty-eighth example embodiment, the present application provides a protective helmet as in any of the forty-fourth through the forty-seventh embodiments, wherein the protective helmet is configured for a use such as bicycling, motorcycling, racing, a sporting event, football, hockey, baseball, cricket, rock climbing, skiing, an equestrian sport, construction, mining, and policing.

BRIEF DESCRIPTION OF THE DRAWINGS

FIG. 12A is a longitudinal cross section of one example embodiment of a load-bearing member of the present application;

FIG. 12B is a longitudinal cross section of one example embodiment of a load-bearing member of the present application;

FIG. 14A is a perspective view of an example embodiment of an assembled flexible spine device;

FIG. 15A is a cross-sectional view of flexible spine morphologies; and

FIG. 15B is a cross-sectional view of flexible spine internal architectures.

DETAILED DESCRIPTION

With reference to FIGS. 1A-5, an example embodiment of an impact protection and shock-absorbing device is shown and designated by the numeral 10. As used herein, shock absorption can comprise one or more interceptions of linear impact forces, angular impact forces and/or shear forces. In the shock-absorbing device, forces are transferred to stored, mechanical energy by one or more flexible members, or elastic spines as will be detailed below. Although the word spine is used herein, any suitable protrusion configured to perform the described interactions below can be used as would be understood in the art. Engineered selection and arrangement of such flexible members, or elastic spines, in the various example embodiments below facilitates controlled deceleration by directing energy into deflection of elastic spines. As the spines deflect, or bend, they impinge upon adjacent spines, thereby dispersing and absorbing the energy into a plurality of adjacent spines. As is well understood in physics, for a given impact or impulse (J) the amount of force (F) delivered to an object is inversely proportional to the amount of time (Δt) the force is applied, as characterized by the equation: $J=F \times \Delta t$. Because the elastic spines gradually slow an object and increase the amount of time that the object is decelerating, the average force applied to the object by a given impact can be substantially reduced. Less force generally results in less damage to the object. The deflected spines can then return to pre-deflection orientations after impact as stored energy is released. The elastic spines can be resilient and capable of bending or flexing under stress multiple times without substantially degrading. Certain portions of impact energy may also be dissipated via heat during spine flexure. As will be detailed below, it will be understood that combinations of spines are suitably implemented to have synergistic impact absorption features.

Figure 1A:
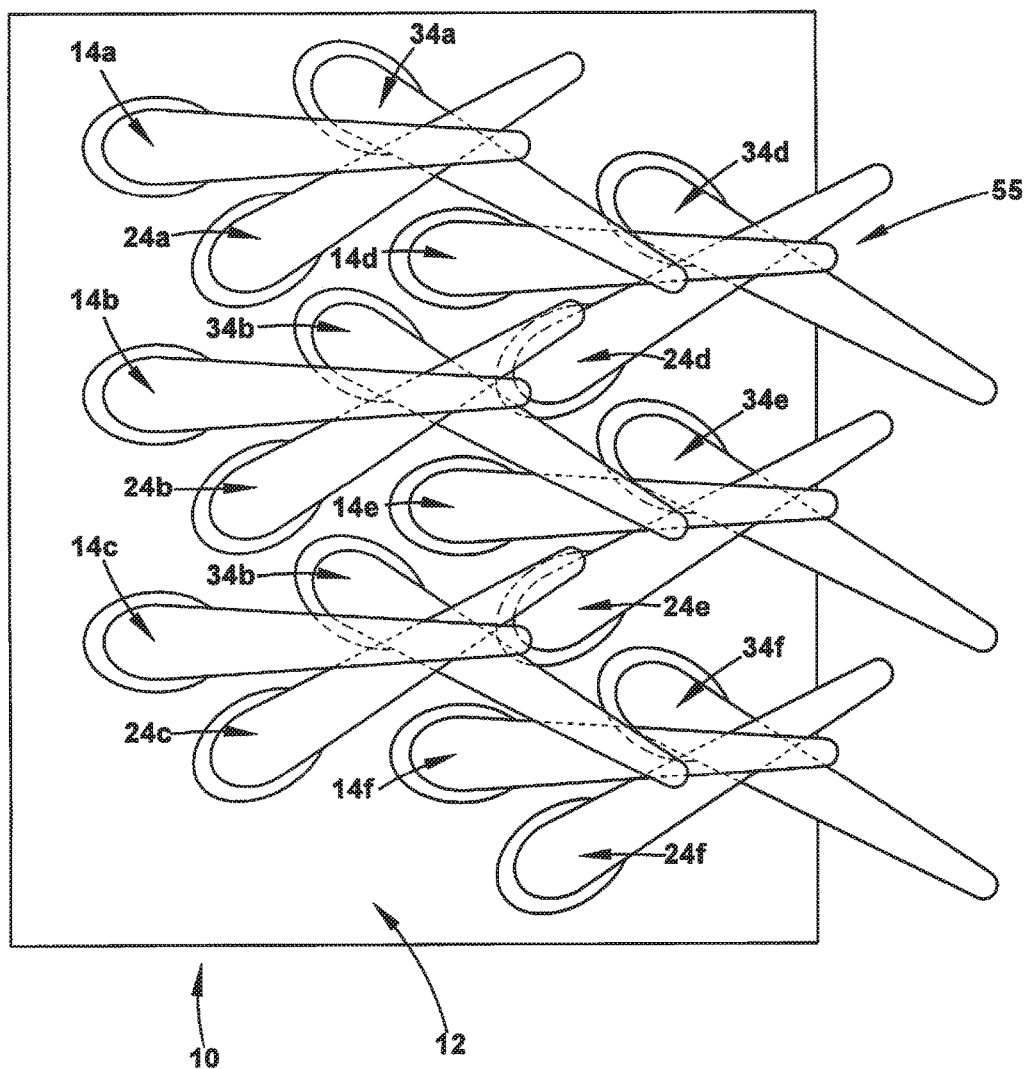
FIG. 1A is a top plan view of an example embodiment of an impact protection device of the present application.
Figure 1B:
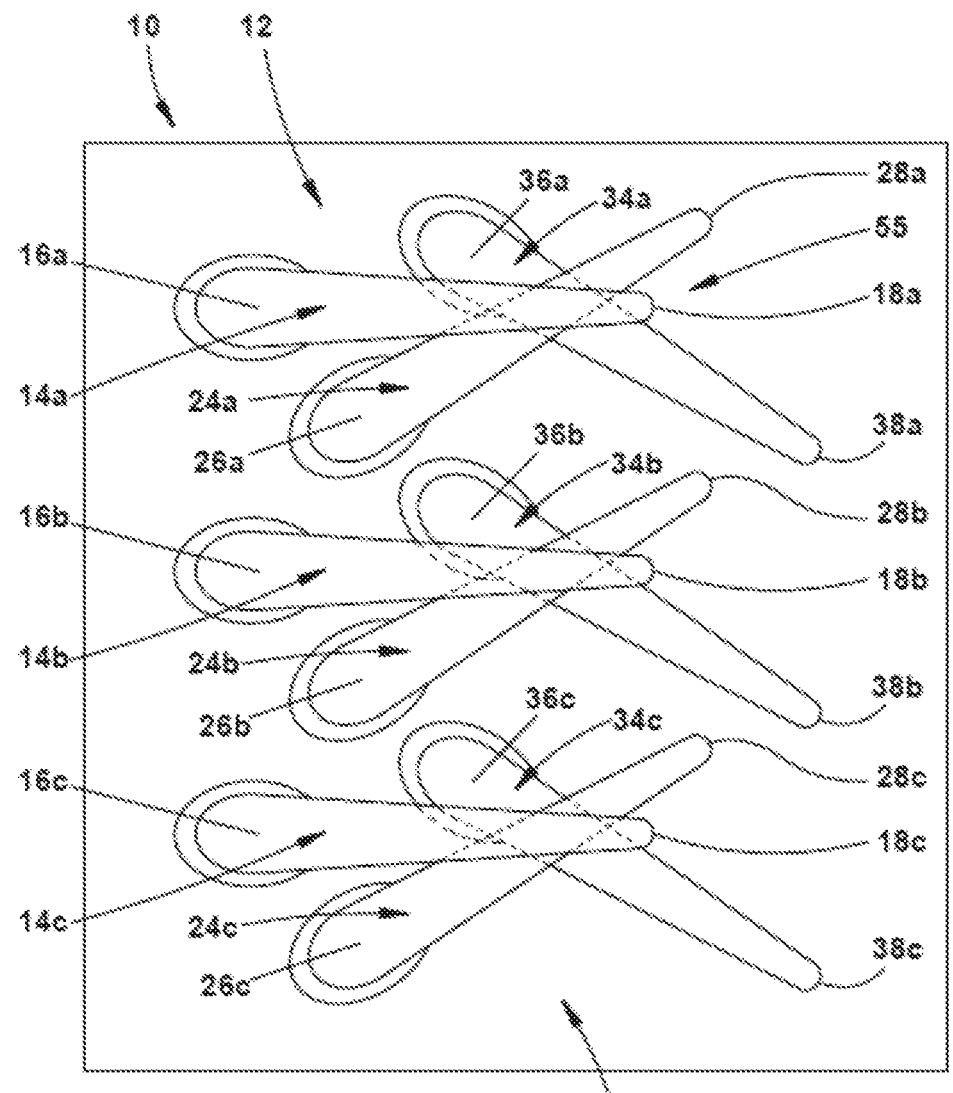
FIG. 1B is an additional top plan view of an example embodiment of an impact protection device of the present application.

The plurality of elastic spines can be uniform or vary in density, and can be homogenous or heterogeneous in form, depending upon the desired level of shock absorption and impact protection or suitability for a particular purpose. One or more of the elastic spines can have a unique internal architecture, spine length, spine diameter, spine shape or morphology, spine surface texture or textures, spine pitch or yaw angles, material composition, and/or elastic modulus, among other suitable characteristics. The plurality of elastic spines can be organized in any suitable array, for example an array where the spines share three common orientations as shown in FIGS. 1a and 1b. In a configuration, the elastic spines can be oriented in an array where the spines share two, three, or multiple common orientations. In a configuration, the elastic spines can be in any array having random or pseudorandom orientations. In a configuration, the elastic spines can be in an array with regularly repeating groups of spines. Any number of elastic spines can be used in combination to achieve a desired level of shock absorption and impact protection.

The elastic spines can be designed for particular applications and types of stress. For example hard hats can be configured with elastic spines that provide extra protection from vertical forces to protect an individual from falling objects. Sporting helmets can be similarly configured to provide all-around equal protection or directionally enhanced protection depending on the position played by the particular user. For example, in football, quarterbacks who are sacked by an opposing team are particularly susceptible to concussions delivered to the back of head when they are tackled to the ground and would therefore benefit from additional directionally enhanced protection. The elastic spines can be customized for application specific needs such as protective gear for specific industries or occupations. Other non-limiting example applications include, but are limited to, packing materials, packaging for safely transporting goods, housing materials for scientific equipment or electronics, transportation and automotive applications for cabin occupant protection or collision protection for a vehicle, flooring for fall protection, shoe insoles and other clothing or attire, and so forth.

Figure 2:
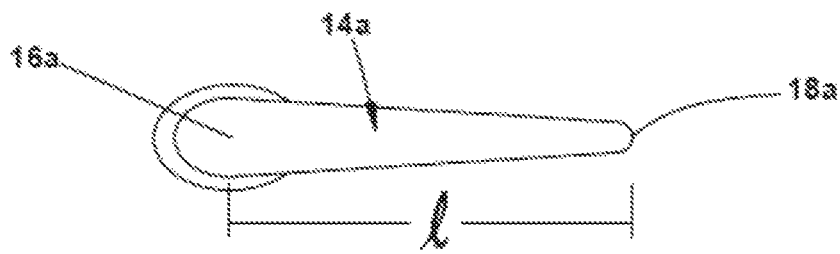
FIG. 2 is a top plan view of an example embodiment of a single spine of the present application.

The device 10 includes a support surface 12 from which extend an array of flexible spines to provide shock absorption. A plurality of flexible spines is shown and designated by the numeral 14, with each spine among the plurality of spines 14 being separately identified with a lower-case letter, as in spines 14a, 14b, 14c . . . 14r. Each spine is secured to the support surface 12 at a base 16, and each has a length l defined from base 16 to a distal end 18, as shown in FIG. 2. As shown with respect to spine 14a in the side schematic elevational view of FIG. 3A, each of the spines 14 extends in one or more longitudinal directions outwardly from the support surface 12 at one or more angles A1, A2, A3 less than 90 degrees. For example, when a support surface 12 is placed on a horizontal surface, each of the spine 14 can be described as extending upwardly from the support surface 12. Said longitudinal directions may result in parallel spines and/or spines at one or more degrees transverse to others such that upon impact, spines deflect and impinge adjacent spines at one or more locations along their lengths, thereby absorbing and dispersing compressive and/or shear forces.

Figure 3A:
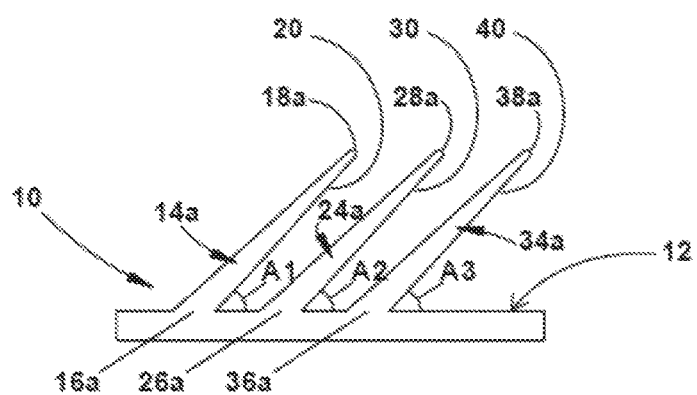
FIG. 3A is a side schematic view showing an example embodiment of the interaction of three separate spines extending from a planar support surface.
Figure 3B:
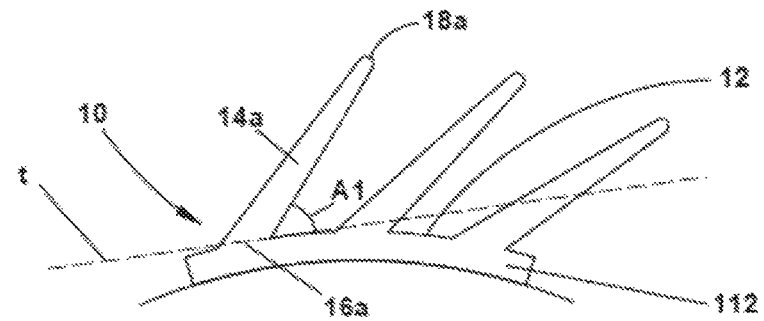
FIG. 3B is a side schematic view showing an example embodiment of the interaction of three separate spines extending from a curved support surface.

Although a planar support surface 12 is shown in FIGS. 1 and 3A, curved support surfaces can also be employed, as seen in FIG. 3B, showing use of a curved support surface 112, with all other elements being identified the same as in the planar support surface example embodiments. In FIG. 3B, the angle A1 is measured relative to a tangent line t drawn where the base of a spine contacts the support surface 112 (spine 14a being shown in FIG. 3B.) References to the spines extending outwardly should be interpreted in light of this understanding with respect to curved support surfaces.

A second plurality of flexible spines is shown and designated by the numeral 24 with each spine of the second plurality of flexible spines 24 being separately identified with a lower case letter, as in spines 24a, 24b, 24c. Each spine of the second plurality of flexible spines 24 is secured to the support surface 12 at a base 26, and each has a length l defined from base 26 to a distal end 28, similar to the length l of each flexible spine 14 of the first plurality of spines as shown in FIG. 2. The length of the spines of the second plurality of flexible spines 24 may be the same or different from the length of the spines of the first plurality of flexible spines. In some example embodiments, the length is the same. As seen in the side schematic elevational view of FIG. 3A, each of the second plurality of flexible spines 24 extends upwardly from the support surface 12 at an angle A2 that is less than 90 degrees such that each of the first plurality of flexible spines 24 creates an overhang 30 over the support surface 12.

Figure 11:
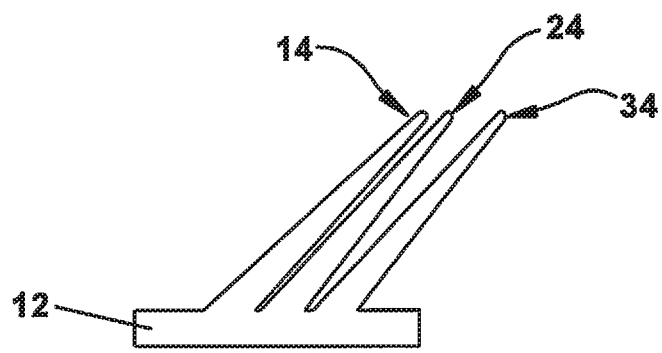
FIG. 11 is a side elevational view showing an example embodiment of the interaction of three separate spines extending from a planar support surface.

FIG. 3A shown a side schematic view of the angles A1, A2, and A3 formed by each spine 14, 24, and 34 of each respective plurality of flexible spines. A more realistic side elevational view of each spine 14, 24, and 34 of each respective plurality of flexible spines, when each spine 24 of said second plurality of flexible spines extends at a transverse angle relative to said longitudinal direction of each spine 14 of said first plurality of flexible spines, and each spine 34 of said third plurality of flexible spines also extends at a transverse angle relative to said longitudinal direction of each spine 14 of said first plurality of flexible spines, is shown in FIG. 11.

In one or more example embodiments, A2 is 80 degrees or less. In other example embodiments, A2 is 70 degrees or less, in other example embodiments, 65 degree or less, in other example embodiments, 60 degrees or less, in other example embodiments, 55 degrees or less, and, in other example embodiments, 50 degrees or less. In some example embodiments, A2 is 20 degrees or more, in other example embodiments, 30 degrees or more, in other example embodiments, 40 degrees or more, and, in other example embodiments, 45 degrees or more. A2 may be the same or different for each spine of the second plurality of flexible spines 24. In some example embodiments, each spine of the second plurality of flexible spines 24 extends at the same angle, A2. A2 may be the same as or different from the angle A1 of the first plurality of flexible spines 14. In some example embodiments, A2 is the same as A1 for all of the first and second plurality of flexible spines 14, 24.

Each spine of the second plurality of flexible spines 24 extends at an angle θ that is transverse to the longitudinal direction of the first plurality of flexible spines 14 such that each of the second plurality of flexible spines extends under the overhang created by a respective neighboring one of the first plurality of flexible spines 14. This is seen by way of example in FIG. 1B, wherein the spines of the second plurality of spines 24 extend under respective neighboring spines of the first plurality of spines 14. Consequently, upon sufficient compression of the first plurality of flexible spines 14 in a downward direction toward the support surface 12 the first plurality of flexible spines 14 will come into contact with the second plurality of flexible spines 24 and compressive forces and/or shear forces are absorbed thereby through a domino effect.

Figure 4A:
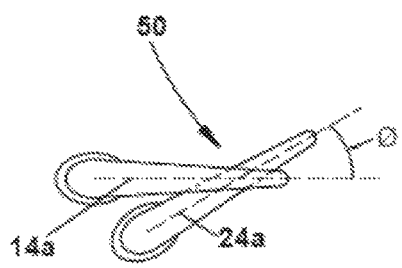
FIG. 4A is a top plan view showing the interaction of two flexible spines.
Figure 4B:
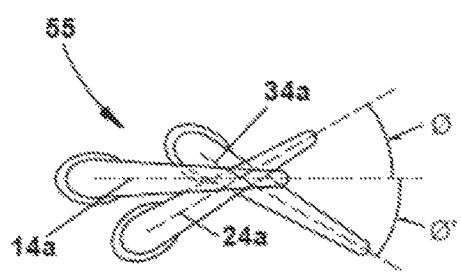
FIG. 4B is a top plan view showing the interaction of three flexible spines.

With reference to FIG. 4A, a spine 14a of the first plurality of flexible spines 14, and a spine 24a of the second plurality of flexible spines 24 create a spine assembly 50 achieving the domino effect. This spine assembly 50 is repeated to cover the necessary portion of the support surface that is to be protected (i.e., the surface needing to have the shock absorption function). A three-member spine assembly 55, such as that shown in the specific example embodiment of FIG. 4B, is also possible, as are assemblies with four or more spines interacting in a similar domino effect manner. The third spine of a three-member assembly is next addressed.

In some example embodiments, a third plurality of flexible spines is employed, as shown and designated by the numeral 34 with each spine of the third plurality of flexible spines 34 being separately identified with a lower case letter, as in spines 34a, 34b, and 34c. Each spine of the third plurality of flexible spines 34 is secured to the support surface 12 at a base 36, and each has a length defined from base 36 to a distal end 38, similar to the length l of each flexible spine 14 of the first plurality of spines as shown in FIG. 2. The length of the spines of the third plurality of flexible spines 34 may be the same or different from the length of the spines of the first plurality of flexible spines 14 and the second plurality of spines 24. In some example embodiments, the length is the same. As seen in the side elevational view of FIG. 3, each of the third plurality of flexible spines 34 extends upwardly from the support surface 12 at an angle A3 that is less than 90 degrees such that each of the first plurality of flexible spines 34 creates an overhang 40 over the support surface 12.

In one or more example embodiments, A3 is 80 degrees or less. In other example embodiments, A3 is 70 degrees or less, in other example embodiments, 65 degree or less, in other example embodiments, 60 degrees or less, in other example embodiments, 55 degrees or less, and, in other example embodiments, 50 degrees or less. In some example embodiments, A3 is 20 degrees or more, in other example embodiments, 30 degrees or more, in other example embodiments, 40 degrees or more, and, in other example embodiments, 45 degrees or more. A3 may be the same or different for each spine of the third plurality of flexible spines 34. In some example embodiments, each spine of the third plurality of flexible spines 34 extends at the same angle. A3 may be the same as or different from the angle A1 of the first plurality of flexible spines 14. In some example embodiments, A3 is the same as A1 for all of the first and third plurality of flexible spines 14, 34.

Each spine of the third plurality of flexible spines 34 extends at an angle θ' that is transverse to both the longitudinal direction of the first plurality of flexible spines 14 and the longitudinal direction of the second plurality of flexible spines 24 such that each spine of the third plurality of flexible spines 34 extends under the overhang created by a respective neighboring one of the first plurality of flexible spines 14 and the overhang created by a respective neighboring one of the second plurality of flexible spines 24. This is seen by way of example in FIG. 1B, wherein spines of the third plurality of flexible spines 34 extend under both the spines of the second plurality of flexible spines 24 and under the respective neighboring spines of the first plurality of flexible spines 14. Consequently, upon sufficient compression of the first plurality of flexible spines 14 in a downward direction toward the support surface 12 the first plurality of flexible spines 14 will come into contact with the second plurality of flexible spines 24, and the second plurality of flexible spines 24 will in turn come into contact with the third plurality of flexible spines 34, and the compressive forces and/or shear forces are adsorbed thereby through an enhanced domino effect.

In some example embodiments, and as schematically represented in FIG. 4B, the spines of one of the second and third plurality of flexible spines, 24 and 34 respectively, extends at a positive transverse angle relative to the longitudinal direction of the first plurality of flexible spines, and the other of the second and third plurality of flexible spines, 24 and 34 respectively, extends at a negative transverse angle relative to the longitudinal direction of the first plurality of flexible spines. This is achieved by placing each spine of the second plurality of flexible spines on a different side of a respective neighboring spine of the first plurality of spines as compared to the associated one of each spine of the third plurality of flexible spines. This is described herein by using the "negative" and "positive" descriptions, which are taken relative to the longitudinal direction of the spines of the first plurality of flexible spines. Negatively transverse is understood as extending at an angle that is less than 0 degrees, wherein an angle of 0 degrees is defined as the longitudinal direction of the first plurality of flexible spines 14, as depicted in FIGS. 4A and 4B.

In other example embodiments, it is contemplated that the spines 24 of the second plurality of flexible spines extend parallel relative to said longitudinal direction of said spines 14 of the first plurality of flexible spines, and each spine 24 of said third plurality of flexible spines also extends parallel relative to said longitudinal direction of said spines 14 of said first plurality of flexible spines. Similar to the arrangement of spines shown in FIG. 4B, upon sufficient compression of the first plurality of flexible spines 14 in a downward direction toward the support surface 12 the first plurality of flexible spines 14 will come into contact with the second plurality of flexible spines 24, and the second plurality of flexible spines 24 will in turn come into contact with the third plurality of flexible spines 34, and the compressive forces and/or shear forces are adsorbed thereby through an enhanced domino effect.

In one specific example embodiment shown in FIG. 4B, spine 14a is shown interacting with respective neighboring spines 24a and 34a, with spine 14a providing the referenced longitudinal direction relative to which spine 24a extends in a negative transverse angle θ and relative to which spine 34a extends in a positive transverse angle θ'. The absolute values of θ and θ' may be the same or different.

In some example embodiments, θ is −10 degrees or less, in other example embodiments, −20 degrees or less, and, in yet other example embodiments, −30 degrees or less. In some example embodiments, θ is −60 degrees or more, in other example embodiments, −40 degrees or more, and, in yet other example embodiments, −20 degrees or more. In some example embodiments, θ is from −10 to −60 degrees and in other example embodiments from −20 to −40 degrees.

In some example embodiments, θ' is 10 degrees or more, in other example embodiments, 20 degrees or more, and, in yet other example embodiments, 30 degrees. In some example embodiments, θ' is 60 degrees or less, in other example embodiments, 40 degrees or less, and, in yet other example embodiments, 20 degrees or less. In some example embodiments, θ is from 10 to 60 degrees and in other example embodiments from 20 to 40 degrees.

Although the example embodiment of the device 10 shown in FIG. 1A contains three different pluralities of flexible spines, specifically the first plurality of flexible spines 14, the second plurality of flexible spines 24, and the third plurality of flexible spines 34, in other example embodiments it is contemplated that other devices could contain only one plurality of flexible spines, in another example embodiment other devices could contain two different pluralities of flexible spines, and in yet other example embodiments other devices could contain more than three different pluralities of flexible spines.

Although the example embodiment of the device 10 shown in FIGS. 1A-5 show each spine 14, 24, and 34 of each respective plurality of spines as being the same length, these figures are not necessarily drawn to scale because in actuality the spines 14 of the first plurality of spines would be viewed as longer than the spines 24 and 24 of the second and third plurality of spines, which in FIGS. 1A-5 are shown as extending in directions transverse to the page, or in other words, going in and out of the page.

Figure 5:
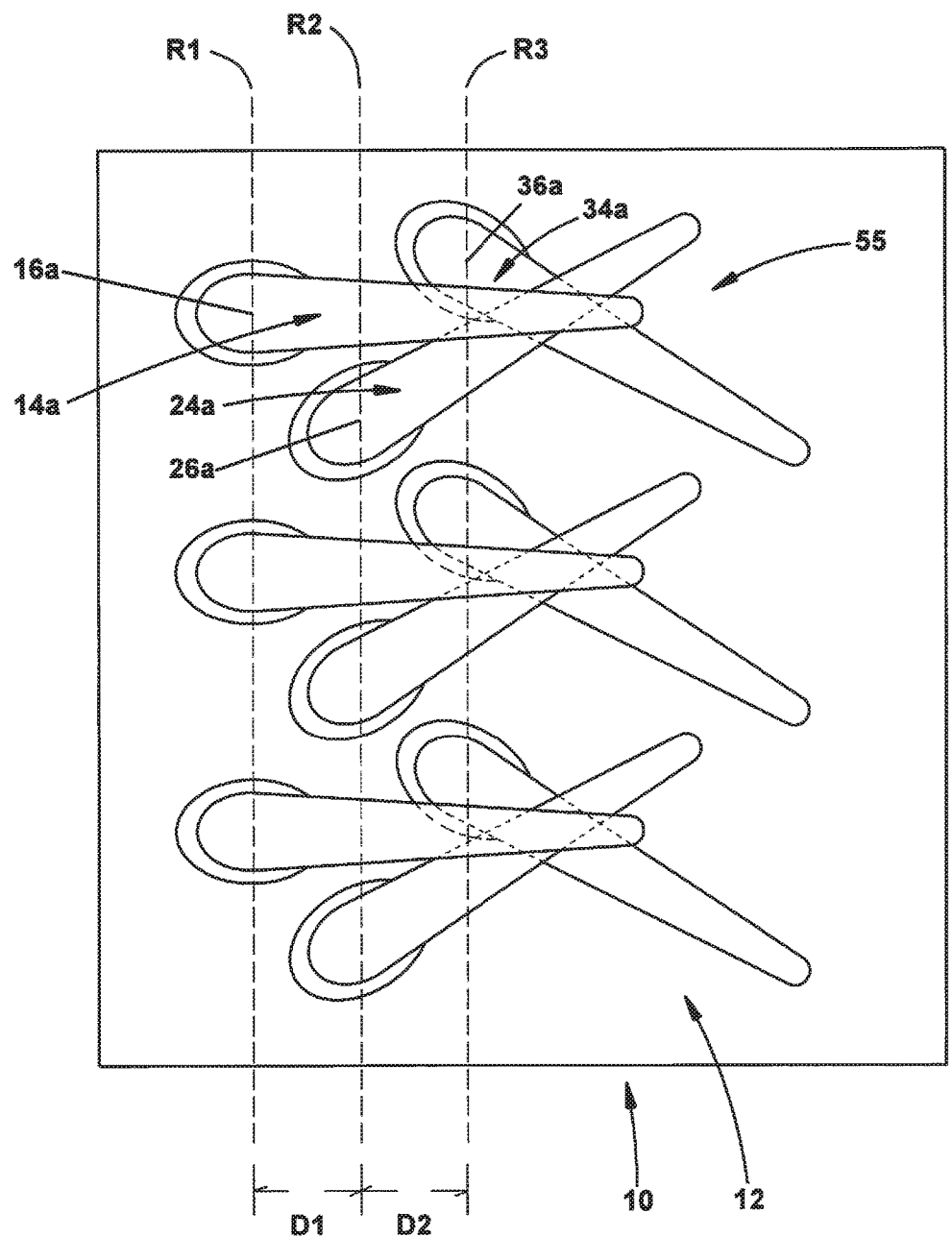
FIG. 5 is a top plan view used to show how spines can be aligned and oriented in some example embodiments of the present application.

In some example embodiments, and as indicated by the dashed line marked R1 in FIG. 5, each base 16 of each spine (e.g., 14a, 14b, 14c) of the first plurality of flexible spines 14 is generally aligned with the others to provide a first row R1 that extends in a direction that is transverse to the referenced longitudinal direction. In some example embodiments, each base 26 of each spine (e.g., 24a, 24b, 24c) of the second plurality of flexible spines 24 is generally aligned with the others to provide a second row R2 that extends in a direction that is transverse to the referenced longitudinal direction, and R2 is spaced apart from row R1 in said longitudinal direction at a distance D1. In some example embodiments, each base 36 of each spine (34a, 34b, 34c) of the third plurality of spines 34 is generally aligned with the others to provide a third row R3 that extends in a direction that is transverse to the referenced longitudinal direction and which is spaced apart from both row R1 and R2 in the longitudinal direction, with a distance D2 between row R2 and R3, and thus a distance D1+D2 between R1 and R3.

In some example embodiments, the transverse direction of the rows R1, R2, R3 is orthogonal to the longitudinal direction defined by the extension of the spines of the first plurality of flexible spines 14 from their base to distal ends.

Alternate designs for the spines themselves are now disclosed, though the present application is not to be limited to or by any specific spine structures disclosed herein. With the understanding that the multitude of spines employed in accordance with this application can be the same or different with respect to the spine structures herein disclosed, only a single spine, herein designated as spine 114, is focused upon, with the understanding that the structures disclosed are applicable to all spines.

Figure 6A:
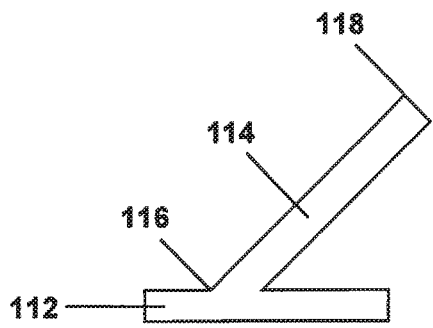
FIG. 6A is a side schematic view of a single spine having a uniform diameter.
Figure 6B:
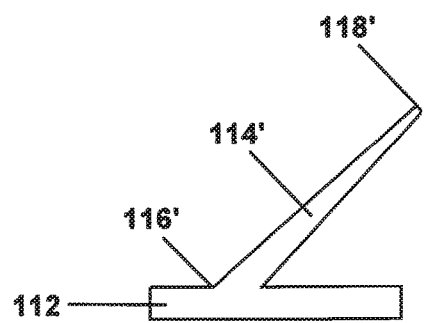
FIG. 6B is a side schematic view of a single spine wherein the base is wider than the distal end.

With reference to FIG. 6A, a single spine 114 can have a uniform shape from the base 116 to the distal end 118. With reference to FIG. 6B a single spine 114' can include a base 116' that is wider than the distal end 118'. In other example embodiments, a single spine can include a base and a distal end that are wider than at the midsection of a spine, and in yet other example embodiments a single spine can include a base and a distal end that are narrower than at the midsection of a spine.

Figure 6C:
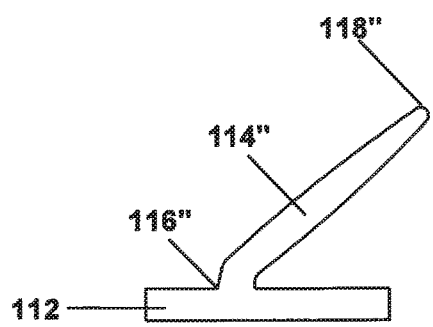
FIG. 6C is a side schematic view of a single spine wherein the base of the spine starts off in a straight manner, and then the spine tapers off a tan angle.
Figure 6D:
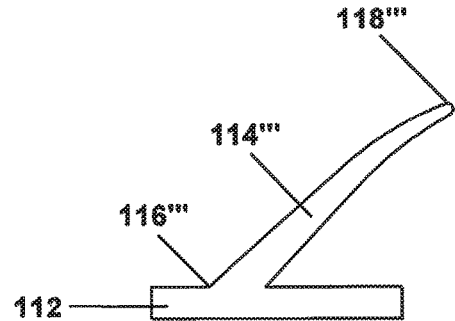
FIG. 6D is a side schematic of a single spine wherein the single spine is curved

With reference to FIG. 6A, a spine 114 can be generally straight and made to extend from the support surface 112 at an angle. In other example embodiments, as seen in the side elevational view of FIG. 6C, a spine 114" can be made to extend from the support surface 112 at a curve, or in other words the base 116" of the spine 114" starts off in a straight manner, and then the spine tapers off at an angle. In yet other example embodiments, as seen in the side elevational view of FIG. 6D, a spine 114''' can be curved. Furthermore, in some example embodiments of the present application, it is contemplated that the manner in which the spines extend from the support surface or the manner in which the distal end of the spine is angled relative to the base of the spine may vary with each individual spine within each plurality of spines.

Figure 7A:
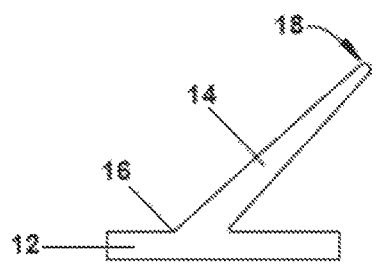
FIG. 7A is a side schematic of a single spine having a fixed connection to a support surface.

In one or more example embodiments, as shown in FIG. 7A, each base of each spine of each plurality of spines is connected to a support surface with a fixed connection. A fixed connection is defined as a connection between each spine and the support surface wherein all three degrees of freedom of the spine are restrained with respect to the support member and the spine, aside from any natural flexibility of the spine base itself. In one or more example embodiments, the spines can be formed integrally with the support surface, such as by molding and or by an additive manufacturing means such as 3D-printing.

Figure 7B:
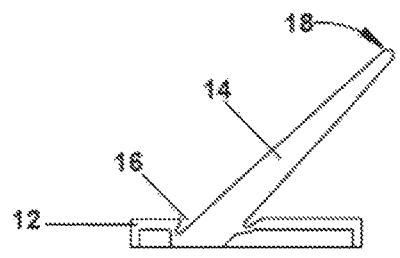
FIG. 7B is a side schematic of a single spine having a flexible connection to a support surface.

In one or more example embodiments, as shown in FIG. 7B each base of each spine of each plurality of spines is connected to a support surface with a flexible connection. A flexible connection is defined as a connection between each spine and the support surface wherein all three degrees of freedom of the spine can move with respect to the support member and the spine, in addition to any natural flexibility of the spine or base itself. In some example embodiments, each base of each spine of each plurality of spines is connected to a support surface with a fixed connection, a flexible connection, or a combination thereof. What is meant by a combination thereof is that in some example embodiments of the present application, it is contemplated that the manner in which the spines are connected to the support surface may vary with each individual spine within each plurality of spines.

Figure 8A:
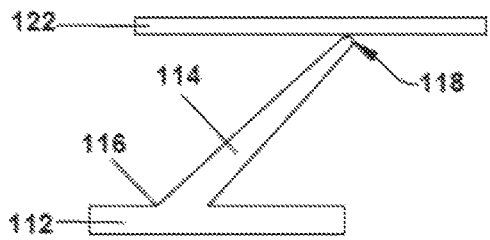
FIG. 8A is a side schematic of a single spine wherein the distal end of the single spine is in contact with, but not connected to, a second surface.
Figure 8B:
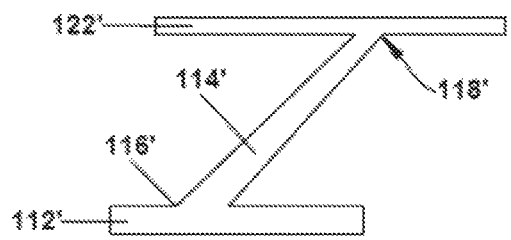
FIG. 8B is a side schematic of a single spine wherein the distal end of the single spine is connected to a second surface.

In one or more example embodiments, as shown in FIG. 8A it is contemplated that the distal end 118 of the single spine 114 will be in contact with, but not connected to, a second surface 122. In yet other example embodiments, as shown in FIG. 8B the second surface 122' will be connected to the distal end 118' of the single spine 114'. The second surface 122' will help evenly compress the spine 114' when a compressive force and/or shear forces is applied to a device.

In one example embodiment, the device as shown in FIGS. 8A and 8B is used as in a sports helmet such as a football helmet. In such an example embodiment, the support surface 112 would be closest to the head of the user of the helmet, either being in direct contact with the head of the user, or being separated from the head of the user with one or more distinct layers of padding and or plastic. The second surface 122 would be closest to the hard exterior shell found in most football helmets. The second surface 122 would either be in direct contact with the hard exterior shell, or be separated from the hard exterior shell with one or more distinct layers of padding and or plastic. In another similar example embodiment, the support surface 112 could be closest to the hard exterior shell and the second surface 122 could be closest to the head of the user of the helmet, which would make the spines "inward-facing".

The spines may be composed of a variety of suitable materials, such as elastomeric material, polymeric material, or any combination thereof. In some example embodiments, one or more spines may be composed of a shape memory material and/or a self-healing material. In another example embodiment, spines are composed of a material selected from the group consisting of Nylon, PET, PVC, POM, PEEK, PEI, PC, PSU, XENOY, blend of PC/PBT, blend of PC/PET, TPE, TPU or any combination thereof. In an embodiment, the spines can be constructed using any desired construction method, including but not limited to injection molding and 3D printing. The spines can be constructed in two or more parts that are then joined together, for example as described below. Advantageously, using 3D printing can allow for spine geometries and internal architectures that might be difficult or impractical to make using other construction methods such as injection molding. In an embodiment, an overmolding technique can be used, for example to apply a layer of polyurethane or other materials to the spines. Overmolding can be used for any suitable purpose, including but not limited to modifying the elasticity of the spines, increasing the durability of the spines, modifying the surface texture of the spines to affect how the spines interact with one another when compressed, protecting the spines, for example from moisture, or purely for aesthetic reasons such as coloring or providing a uniform look to the spines.

In one or more example embodiments, one or more spines may be composed of a combination of both hard material, suitably with a relatively high density, and a softer material, suitably with a relatively low density. A low density material suitably includes a fluid such as water or air, in essence the spine would be largely hollow and air would fill the space(s) in an example embodiment. In some example embodiments, wherein both hard material and low density material is employed, the low density material occupies the areas seen in example embodiments herein as being hollow.

Figure 9A:
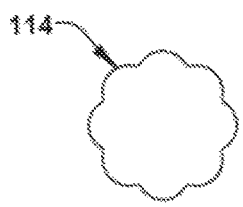
FIG. 9A is an orthogonal cross section of a single spine of one example embodiment of the present application.
Figure 9B:
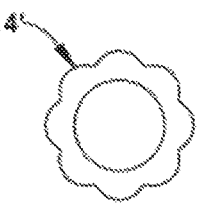
FIG. 9B is an orthogonal cross section of a single spine of one example embodiment of the present application.
Figure 9C:
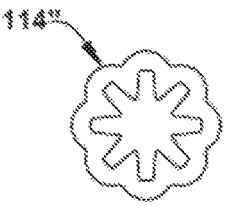
FIG. 9C is an orthogonal cross section of a single spine of one example embodiment of the present application.
Figure 9D:
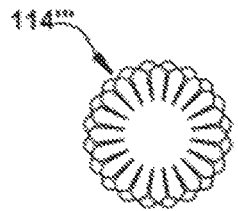
FIG. 9D is an orthogonal cross section of a single spine of one example embodiment of the present application.
Figure 9E:
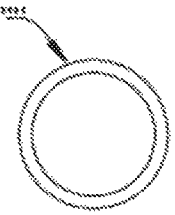
FIG. 9E is an orthogonal cross section of a single spine of one example embodiment of the present application.
Figure 9F:
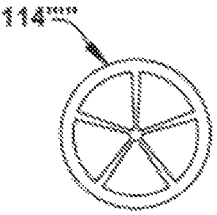
FIG. 9F is an orthogonal cross section of a single spine of one example embodiment of the present application.

FIGS. 9A to 9F show horizontal cross sections of a single spine and are representative of potential example embodiments wherein a single spine is composed of both a hard material and a low density material. In FIG. 9A, the entirety of the spine would be filled with a hard material. In FIGS. 9B, 9C and 9E, the shaded outer area comprises hard material whereas the center of the spines 114', 114", and 114"'' would be filled with a low density material. In FIGS. 9D and 9F, the dark solid lines represent areas of hard material within the single spines 114''' and 114'''' respectively, and the center of the spines and all cavities created by the location of the hard material, would be filled with a low density material.

Figure 10A:
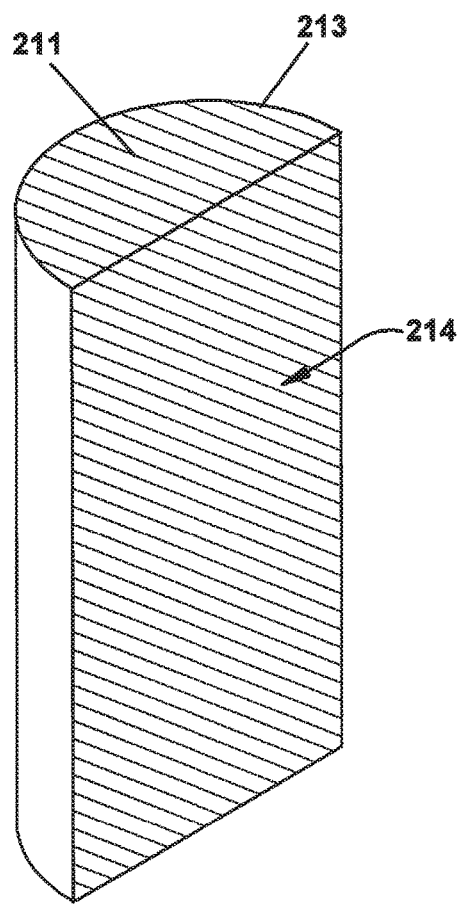
FIG. 10A is a longitudinal cross section of a single spine of one example embodiment of the present application.
Figure 10B:
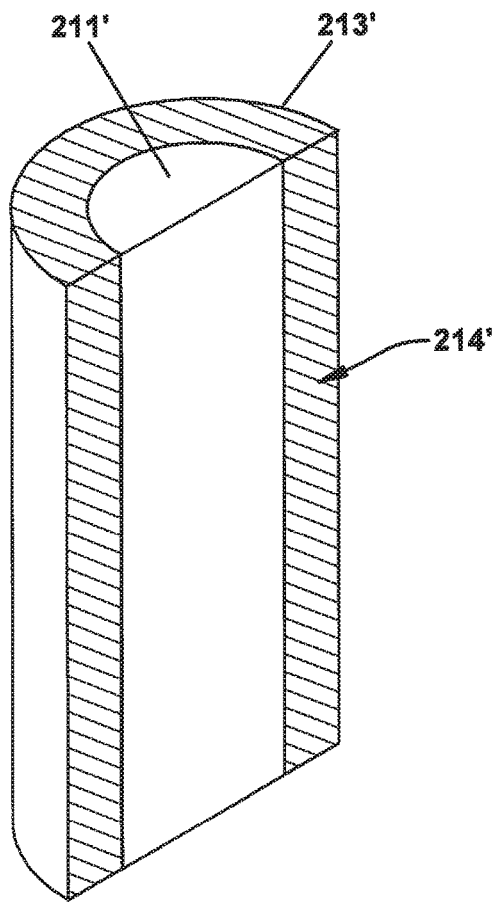
FIG. 10B is a longitudinal cross section of a single spine of one example embodiment of the present application.

In one or more example embodiments, it is contemplated that the interior of one or more spines may contain a unique internal architecture, may be solid, may be hollow, or any combination thereof. FIG. 10A shows a longitudinal cross section of a spine designated as spine 214. Spine 214 is a solid spine, meaning that the entire interior 211 of the spine 214, from one side of the external wall 213 to the other side of the external wall 213 is completely filled with one or more of the suitable materials discussed above. FIG. 10B shows a longitudinal cross section of a spine designated as spine 214'. Spine 214' contains two different materials, the external wall 213' is formed of one material, for example a hard material, and the interior space 211' of the spine 214' contains either a low density material, or no material at all, meaning that the spine 214' is filled with air.

Figure 10C:
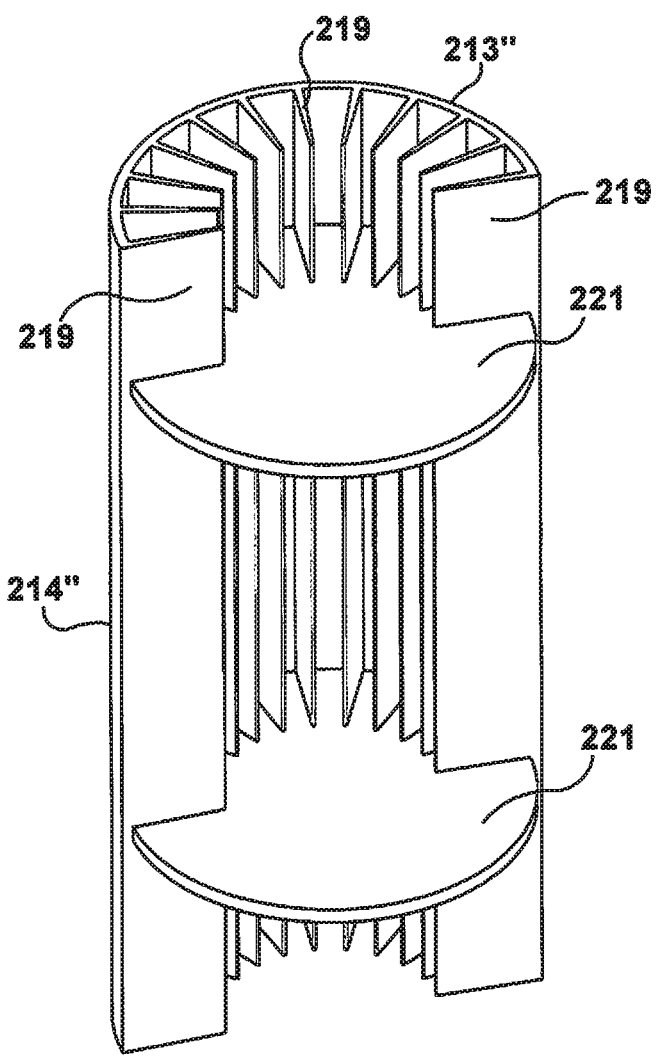
FIG. 10C is a longitudinal cross section of a single spine of one example embodiment of the present application.

FIG. 10C shows a longitudinal cross section of a spine designated as spine 214". Spine 214" has a plurality of longitudinal structures 219 which extend around the external wall 213". The interior of spine 214" is generally hollow except that it contains a plurality of radial structures 221. Although only two radial structures 221 are shown, it is contemplated that more than two or less than two radial structures 221 could be in each spine 214". The longitudinal structures 219 and the radial structures 221 comprise the unique internal architecture of spine 214". The unique internal architecture of spine 214" contributes to increased resilience via delayed onset of permanent deformation when the spine 214" has compressive and/or shear forces applied to it. The longitudinal structures 219 also increase the bending stiffness of the spine 214" and the radial structures 221 help to prevent ovalization of the spine 214". In one or more example embodiments one or more spines contains both longitudinal structures and radial structures, in other example embodiments one or more spines contain just longitudinal structures and not radial structures, one or more spines contain just radial structures and no longitudinal structures, one or more spines contains neither longitudinal nor radial structures, or any combination thereof.

The modulus of elasticity (also known as the elastic modulus, the tensile modulus, or Young's modulus) is a number that measures an object or substance's resistance to being deformed elastically (i.e., non-permanently), when a force is applied to it. The elastic modulus of an object is defined as the slope of its stress-strain curve in the elastic deformation region. A stiffer material will have a higher elastic modulus.

In one or more example embodiments, the elastic modulus of the spines may be the same or different, and each has an elastic modulus of from about 1 GPa to 10 about GPa.

In one or more example embodiments, the length to width ratio of each spine is the same or different, and each has a length to width ratio (wherein the width of the spine is measured at the midpoint of the spine) of between about 5:1 and about 25:1.

In one or more example embodiments, spines are packed on a device at between about 1 and 100 spines per square inch. In yet other example embodiments the spine density may vary across the entirety of the device.

In one or more example embodiments, the spines can be configured to have different morphologies, or shapes. For example, the spines can be constructed in a variety of shapes such as conical, cylindrical, oval, and or any other geometric shape imaginable. In one or more example embodiments, the spines can vary throughout such that the spines do not all have the same shape or size.

In one or more example embodiments, the device of the present application may be implemented in personal protective equipment, impact protection in automobiles and aerospace vehicles, disposable secondary packaging, transport cases, built-in housing, shock-absorbing infrastructure, soundproofing, or anything of the like.

Spines mimicking the general structure of FIG. 10C have been found to be useful outside of the spine arrays disclosed above. They are useful alone or in combination with other structural elements or other single spines as load-bearing members, and could be employed in a multitude of load-bearing example embodiments. They could find use as struts, as support columns, as sailboat masts, as tent poles, as fishing rods, as protective fencing, or as dental implants. Additional disclosure of such a single spine is provided here with reference again to FIG. 10C, though the example embodiment of FIG. 10C is exemplary only. Indeed, FIGS. 12A and 12B are employed to describe this general concept of employing a single spine as a structural member outside of the spine arrays already disclosed.

With reference to FIGS. 12A and 12B a load-bearing member 300 includes a spine body 301 having longitudinal length L and an interior defining an interior volume V. A plurality of longitudinal structures 302 having longitudinal length and extending along radial lines into the interior volume V toward a center axial line 303 of spine body 301, the plurality of longitudinal structures 302 ending prior to the center axial line 303 so as to define channels 304 between neighboring ones of the plurality of longitudinal structures 302. In a configuration, the longitudinal structures 302 can be termed longitudinal stiffeners as they can be used to increase deflection resistance of the spine body 301.

In one or more example embodiments, the load-bearing member 300 further comprises a plurality of radial structures 305 within said interior volume V and extending along the longitudinal length L of said spine body 301. In one or more example embodiments, said plurality of radial structures 305 are disc shaped and extend into said channels 304 formed between neighboring ones of the plurality of longitudinal structures 302. In one or more example embodiments, said plurality of radial structures 305 each extend completely across the entirety of the interior volume V of the load-bearing member 300. In a configuration, the radial structures 305 can be termed radial stiffeners as they can be used in conjunction with longitudinal structures 302 to increase deflection resistance of the spine body 301.

In one or more example embodiments the plurality of radial structures 305 are without apertures such that neighboring ones of said plurality of radial structures 305 create distinct chambers, such as chamber 306 shown in FIG. 12A between them. However, it is also contemplated that said radial structures 305 could contain apertures such that neighboring ones of said plurality of radial structures 305 do not create distinct chambers between them.

In one or more example embodiments, said cylindrical tubular body 301 defines a radius which extends from said center axial line 303 to an exterior surface 307 of said cylindrical tubular body 300. Said plurality of longitudinal structures 302 extend into the interior volume V toward said center axial line 303 at a length of in some example embodiments, less than 95 percent of the radius, in other example embodiments less than 85 percent of the radius, and in yet other example embodiments less than 75 percent of the radius. In some example embodiments said plurality of longitudinal structures 302 extend into the interior volume V toward said center axial line 303 at a length of greater than 25 percent of the radius, in other example embodiments greater than 40 percent of the radius, and in yet other example embodiments greater than 50 percent of the radius. In some example embodiments said plurality of longitudinal structures 302 extend into the interior volume V toward said center axial line 303 at a length of from 25 to 95 percent of the radius, in other example embodiments from 40 to 85 percent of the radius, and in yet other example embodiment from 50 to 75 percent of the radius.

In one or more example embodiments, said cylindrical tubular body 301 defines a circumference at said interior, and each of said plurality of longitudinal structures 302 extend inwardly from this interior circumference and are positioned about the circumference such that neighboring ones of said plurality of longitudinal structures 302 are positioned at less than 90 radial degrees from one other, in other example embodiments at less than 75 radial degrees from one another, and in yet other example embodiments at less than 60 radial degrees from one another. In one or more example embodiments, neighboring ones of said plurality of longitudinal structures 302 are positioned at greater than 10 radial degrees from each other, in other example embodiments at greater than 25 degrees from one another, and in yet other example embodiments greater than 40 degrees from one another. In some example embodiments, neighboring ones of said plurality of longitudinal structures 302 are positioned at from 90 to 10 radial degrees from each other, in other example embodiments from 75 to 25 radial degrees from each other, and in yet other example embodiments from 60 to 40 radial degrees from each other.

In one or more example embodiments, the plurality of longitudinal structures 302 are positioned at regular intervals around said circumference of the cylindrical tubular body 301.

In one or more example embodiments, the material forming the spine body 301, the longitudinal structures 302, and any radial structures 305 has a modulus of from about 1 GPa to about 10 GPa. In one example embodiment, the material forming the spine body 301, the longitudinal structures 302, and any radial structures 305 is composed of a material selected from the group consisting of Nylon, PET, PVC, POM, PEEK, PEI, PC, PSU, XENOY, blend of PC/PBT, blend of PC/PET, TPE, TPU or any combination thereof. In one or more example embodiments, the interior volume V of the load-bearing member 300, not filled by the material of the spine body 301, the longitudinal structures 302, and any radial structures 305, could be filled with air and or any of the materials listed above.

In one or more example embodiments one or more spines may be composed of a combination of both hard material, suitably with a relatively high density and a softer material with a relatively low density. A low density material suitably includes a fluid such as water or air, in essence the spine would be largely hollow and air would fill the space(s) in an example embodiment. In some example embodiments wherein both hard material and low density material is employed, the low density material occupies the areas seen in example embodiments herein as being hollow.

In one or more example embodiments, the exterior surface 307 of the load-bearing member 300 is a corrugated exterior surface 307. The corrugated exterior surface 307 defines ridges 308 between neighboring ones of said plurality of longitudinal structures 302 and defines grooves 309 where each one of said plurality of longitudinal structures 302 extends from said spine body 301. In such an example embodiment, said ridges 308 form a surface of said channels 304 formed between neighboring ones of said plurality of longitudinal structures 302. In example embodiments wherein said exterior surface 307 is a corrugated exterior surface, the corrugated exterior surface 307 still provides a generally circular cross section and thus the longitudinal structures 302 can still be conceived as extending inwardly from said exterior surface. Although the support members 300 shown in FIGS. 12A and 12B are shown having a corrugated exterior wall, it is also contemplated that said support members could have smooth exterior walls, such as the shown in FIG. 10C.

As shown in FIG. 12A, in some example embodiments, the load-bearing member 300 can further comprise an interior circumferential wall 310 at which said plurality of longitudinal structures 302 end. In such an example embodiment, said circumferential wall 310 will form a surface of said channels 304 formed between neighboring ones of said plurality of longitudinal structures 302. In other example embodiments, such as shown in FIG. 12B, the plurality of longitudinal structures 302 will not end in an interior circumferential wall. In such an example embodiment, the channels 304 formed between neighboring ones of said plurality of longitudinal structures 302 will be open channels 304.

Figure 13:
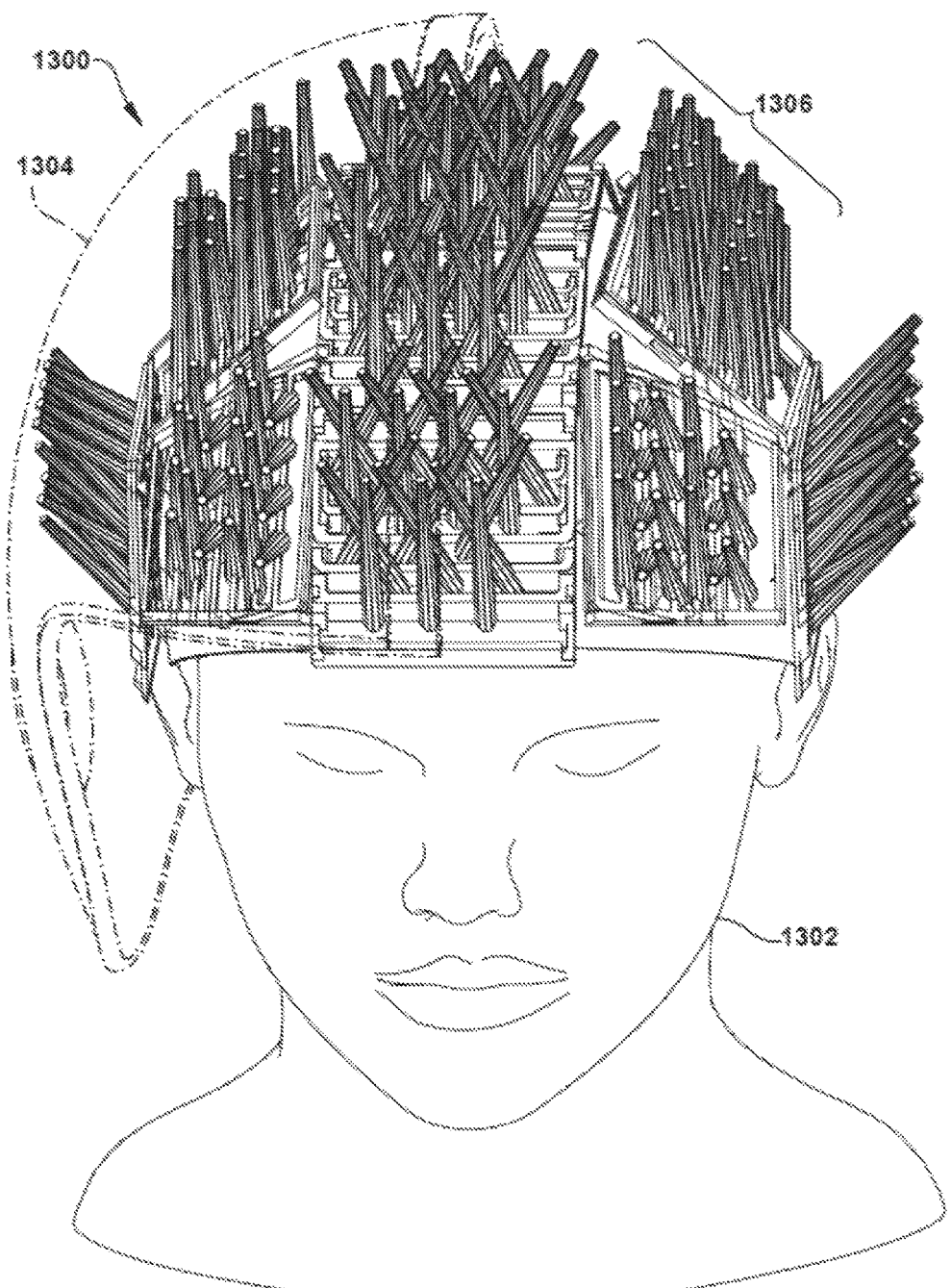
FIG. 13 is a cutaway view of an example embodiment of a helmet having a protective safety liner comprised of assembled flexible spine devices.

As shown in FIG. 13, in an example embodiment, a helmet 1300 for protecting a person's head 1302 includes a shell 1304, and flexible spine assemblies 1306 that form a protective safety liner inside shell 1304. Each of the flexible spine assemblies 1306 can comprise an array of interconnecting flexible spine portions as will be described in greater detail in FIGS. 14A and 14B. The flexible spine assemblies 1306 form a protective safety liner that provides impact protection and shock absorption for a person's head 1302. When the shell 1304 of the helmet 1300 is impacted, for example during a sports activity such as football or hockey, the flexible spine assemblies 1306 elastically compress and deform to absorb and disperse compressive and/or shear forces through deflection and impingement of the flexible spines in the flexible spine assemblies 1306 as described above. The force of the impact to the helmet 1300 is spread over one or more flexible spine assemblies 1306. Not only are the forces distributed spatially over one or more flexible spine assemblies 1306, but the forces are also distributed temporally over a short period of time as the flexible spine assemblies 1306 elastically compress to absorb the impact. As a result, the average force that is applied to a person's head inside the helmet 1300 can be greatly reduced. After the impact, the flexible spine assemblies 1306 return to their original shape ready to absorb additional impacts.

In additional embodiments, the protective safety liner of the helmet 1300 can include any suitable number of flexible spine assemblies. In one embodiment, the protective safety liner of the helmet 1300 can include multiple layers which can include one or more layers of flexible spine assemblies and/or other materials. In another embodiment, the protective safety liner of the helmet 1300 can also be comprised of a single flexible spine liner, for example a unitary liner that is made as a single unit and secured inside the helmet 1300. In various configurations, the protective safety liner of the helmet 1300 can be customized to an individual person's head, customized for different sports, and customized for specific types of impacts based on the position a person plays on a sport team. For example, in football certain members of a team that play on the line may receive a greater number of serious impacts to the top portions of their helmets, while quarterbacks may be more likely to receive impacts to the back of their heads when being sacked. In hockey, members of a team may need more universal protection due to impacts with both the ice and with other players. The protective safety liner of the helmet 1300 can be configured to best suit the anticipated safety needs of a particular player, a particular position on the field of play, and the activity itself. Advantageously, the air spaces between spines can allow air to flow between the spines, allowing the liner to both feel cooler and potentially remove accumulating moisture, thereby providing greater comfort to the user during use.

Figure 14B:
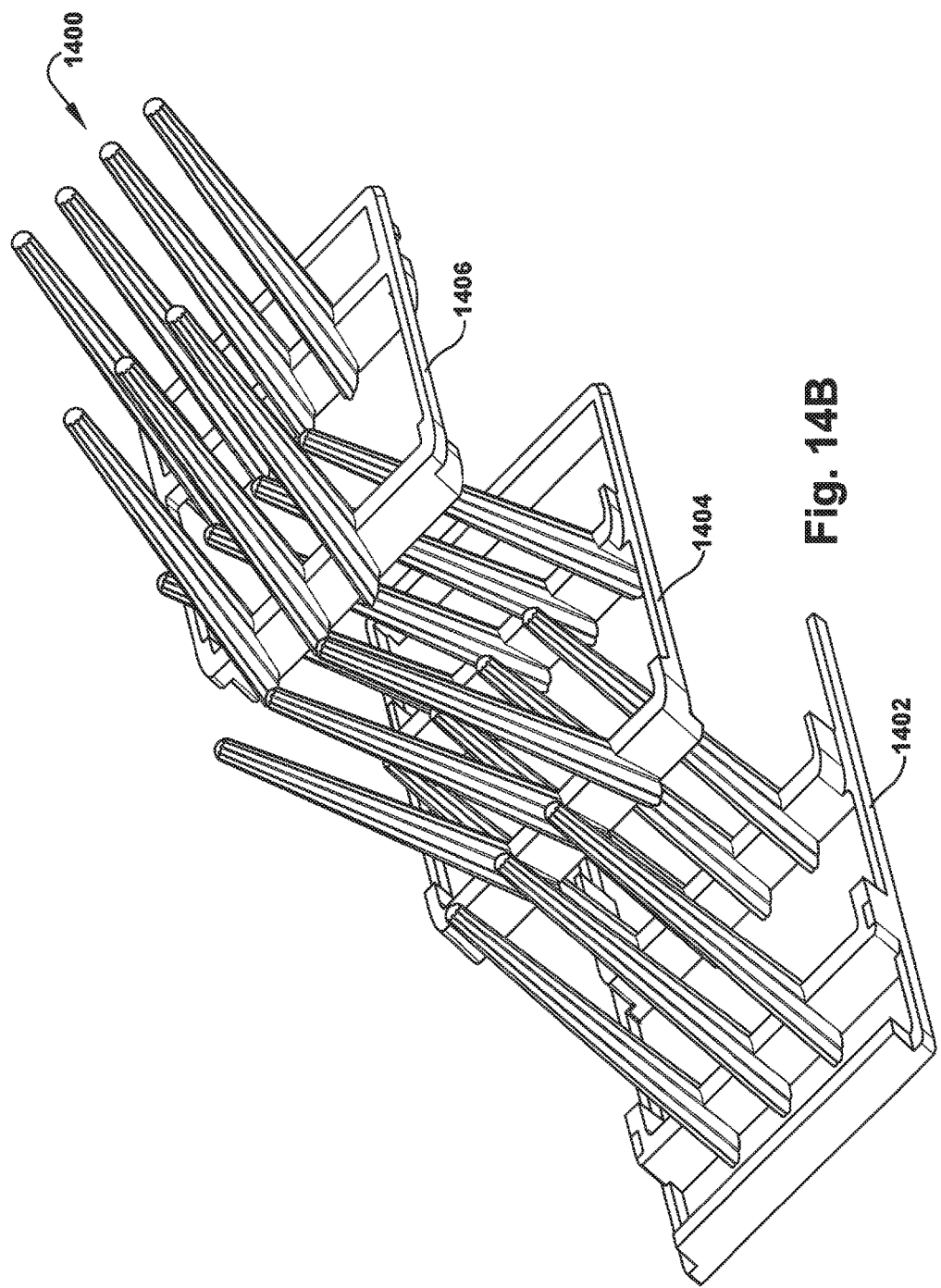
FIG. 14B is an exploded view of the flexible spine device of FIG. 14A.

As shown in FIGS. 14A and 14B, in an example embodiment, a flexible spine device 1400 can be comprised of a plurality of flexible spine parts 1402, 1404, 1406 such as a base flexible spine part 1402, a center flexible spine part 1404, and a top flexible spine part 1406 as illustrated. FIG. 14A shows an assembled flexible spine device 1400 while FIG. 14B shows an exploded view of the flexible spine device 1400 before being assembled together. The flexible spine parts 1402, 1404, 1406 can be configured to stack together. A flexible spine device 1400 can be assembled by positioning and securing the center flexible spine part 1404 on the base flexible spine part 1402, and then positioning and securing the top flexible spine part 1406 on the center flexible spine part 1404. The flexible spine parts 1402, 1404, 1406 can be secured to one another using any suitable adherent such as a glue or a cement. The flexible spine parts 1402, 1404, 1406 can be bonded thermally, chemically, by ultrasonic welding, by radio frequency welding, by overmolding, or by exposure to certain frequencies of light such as is performed in curing using ultraviolet light as would be understood in the art. The flexible spine device 1400 can be substantially planar as shown, or can be curved for example to better accommodate a person's head when used in a helmet as described above.

As shown in FIGS. 15A and 15B, cross-sections of various flexible spine configurations are presented. In a first example embodiment, a flexible spine 1502 having a tapered edge presented. The flexible spine 1502 comprises a substantially oval middle portion that tapers to points at the ends. In a second example embodiment, a flexible spine 1504 having a rounded tapered edge is presented. The flexible spine 1504 includes a substantially oval middle portion that tapers to rounded ends. The flexible spines 1502, 1502 can be substantially solid (as shown) or can include cavities as described below.

In the third, fourth, fifth, and sixth example embodiments, flexible spines with internal structural architectures 1510, 1520, 1530, 1540 are presented. A flexible spine 1510 can include one or more internal cavities 1512, for example three internal cavities 1512, separated by an internal stiffener 1514 that radiates from a substantially center point to the edge of the flexible spine 1510. In a configuration, the internal stiffener 1514 can be offset from the center point. A flexible spine 1520 can include one or more internal cavities 1522 separated by an internal stiffener 1524 that has two or more branches 1526. A flexible spine 1530 can include a single cavity 1532 with edge stiffeners 1536 and a separate center stiffener 1534. A flexible spine 1540 can include a center cavity 1538, an inner concentric ring stiffener 1534, inner ring connectors 1536 that connect the inner concentric ring stiffener 1534 to the edge of the flexible spine 1540, and two or more cavities displaced between the inner concentric ring stiffener 1534 and the edge of the flexible spine 1540.

In light of the foregoing, it should be appreciated that the present disclosure significantly advances the art by providing an impact protection device that is structurally and functionally improved in a number of ways. While example embodiments of the disclosure have been disclosed in detail herein, it should be appreciated that the disclosure is not limited thereto or thereby inasmuch as variations on the disclosure herein will be readily appreciated by those of ordinary skill in the art. The scope of the application shall be appreciated from the claims that follow.

What is claimed is:

1. An impact protection device comprising:
   a. a support surface;
   b. a first plurality of flexible spines, each having a length defined from a base end to a distal end thereof, and each extending in a longitudinal direction upwardly from said support surface, from said base end to said distal end, at an angle less than 90 degrees such that each of said first plurality of flexible spines creates an overhang over said support surface; and c. a second plurality of flexible spines, each having a length defined from a base end to a distal end thereof, and each extending upwardly from said support surface from said base end to said distal end at an angle less than 90 degrees such that each of said second plurality of flexible spines creates an overhang over said support surface, and wherein each of said second plurality of spines extends such that each of said second plurality of flexible spines extends under the overhang created by a respective neighboring one of said first plurality of flexible spines, whereby, upon sufficient compression of said first plurality of flexible spines in a downward direction toward said support surface, said first plurality of flexible spines contacts said second plurality of flexible spines and compressive forces and/or shear forces are absorbed thereby.

2. The impact protection device of claim 1, further comprising a third plurality of flexible spines, each having a length defined from a base end to a distal end thereof, and each extending upwardly from said support surface from said base end to said distal end at an angle less than 90 degrees such that each of said third plurality of flexible spines creates an overhang over said support surface, each of said third plurality of flexible spines extends such that each of said third plurality of flexible spines extends under the overhang created by a respective neighboring one of said first plurality of flexible spines and the overhang created by a respective neighboring one of said second plurality of flexible spines, whereby, upon sufficient compression of said first plurality of flexible spines in a downward direction toward said support surface, a respective one of said first plurality of flexible spines contacts a respective neighboring one of said second plurality of flexible spines and said one of said second plurality of flexible spines contacts a respective neighboring one of said third plurality of flexible spines and compressive forces and/or shear forces are absorbed thereby.

3. The impact protection device of claim 2, wherein each of said second plurality of flexible spines extends parallel relative to said longitudinal direction of said first plurality of flexible spines, and each of said third plurality of flexible spines extends parallel relative to said longitudinal direction of said first plurality of flexible spines.

4. The impact protection device of claim 2, wherein each of said second plurality of flexible spines extends at a positively transverse angle relative to said longitudinal direction of said first plurality of flexible spines, and each of said third plurality of flexible spines extends at a negatively transverse angle relative to said longitudinal direction of said first plurality of flexible spines.

5. The impact protection device of claim 2, wherein each of said second plurality of flexible spines extends at a negatively transverse angle relative to said longitudinal direction of said first plurality of flexible spines, and each of said third plurality of flexible spines extends at a positively transverse angle relative to said longitudinal direction of said first plurality of flexible spines.

6. The impact protection device of claim 2, wherein a row of said first plurality of flexible spines is aligned in a first row extending in a transverse direction of said longitudinal direction, wherein a row of said second plurality of flexible spines is aligned in a second row extending in a transverse direction of said longitudinal direction and spaced apart from the first row in said longitudinal direction, and wherein a row of said third plurality of flexible spines is aligned in a third row extending in a transverse direction of said longitudinal direction and spaced apart from both said first row and second row in said longitudinal direction.

7. The impact protection device of claim 2, wherein the support surface defines a plane and equates to an angle of 0 degrees and each of the first plurality of flexible spines extends at an angle between about 30 degrees to about 80 degrees, each of the second plurality of flexible spines extends at an angle between about 30 degrees to about 80 degrees, and each of the third plurality of flexible spines extends at an angle between about 30 degrees to about 80 degrees.

8. The impact protection device of claim 2, wherein the spines from the first plurality, the second plurality, and the third plurality have shapes selected from the group consisting of a uniform shape from its base to its distal end, a base that is wider than its distal end, a base that is narrower than its distal end, or combinations thereof.

9. The impact protection device of claim 2, wherein the bases of the spines from the first plurality, the second plurality, and the third plurality are connected to the support surface with either a fixed connection, a flexible connection, or a combination thereof.

10. The impact protection device of claim 2, wherein the device further. comprises a second support surface and wherein the distal ends of each of the first plurality of spines, the second plurality of spines, and the third plurality of spines are either each connected to the second support surface, are each in contact with the second surface, or a combination thereof.

11. The impact protection device of claim 2, wherein each spine of each of the first plurality of spines, the second plurality of spines, and the third plurality of spines are composed of materials selected from the group consisting of elastomeric material, polymeric material, a shape memory material, a self-healing material, or any combination thereof.

12. The impact protection device of claim 2, wherein each spine of each of the first plurality of spines, the second plurality of spines, and the third plurality of spines contain both longitudinal stiffeners and radial stiffeners, just longitudinal stiffeners and not radial stiffeners, just radial stiffeners and not longitudinal stiffeners, neither longitudinal stiffeners or radial stiffeners, or any combination thereof.

13. The impact protection device of claim 2, wherein each spine of each of the first plurality of spines, the second plurality of spines, and the third plurality of spines has an elastic modulus of between about 1 GPa and about 10 GPa or any combination thereof; each spine of each of the first plurality of spines, the second plurality of spines, and the third plurality of spines has a length to width ratio of between about 5:1 and about 25:1; and wherein spines of the first plurality of spines, the spines of the second plurality of spines, and the spines of the third plurality of spines are packed on the device at between about 1 and 100 spines per square inch.

14. An impact protection device, comprising:
a support surface; and
a plurality of flexible spines comprising one or more sizes, each having a length defined from a base portion at the support surface to a distal portion thereof,
wherein one or more spines extend in one or more longitudinal directions outwardly from said support surface, at one or more angles less than 90 degrees, and
wherein deflecting of one or more flexible spines by an impact force causes impingement onto, and deflecting of, one or more other flexible spines thereby dispersing and reducing impact forces.

15. The impact protection device of claim 14, wherein the plurality of flexible spines are configured to provide directionally enhanced impact protection and shock absorption.

16. The impact protection device of claim 14, wherein the plurality of flexible spines are configured to provide application specific impact protection and shock absorption for a sport, a sporting position, an industry or occupation, clothing, a package, a housing, transportation vehicles, or flooring.

17. The impact protection device of claim 14, wherein the bases of the flexible spines are connected to the support surface with either a fixed connection, a flexible connection, or a combination thereof.

18. The impact protection device of claim 14, wherein the device further comprises a second support surface and wherein the distal ends of one or more of the flexible spines are either connected to the second support surface, in contact with the second surface, or a combination thereof.

19. The impact protection device of claim 14, wherein each of the flexible spines is composed of materials selected from the group consisting of elastomeric material, polymeric material, a shape memory material, a self-healing material, or any combination thereof.

20. The impact protection device of claim 14, wherein one or more flexible spines have a non-solid interior space with an internal architecture comprising one or more of one or more longitudinal structures extending through at least a portion of the spine length, or one or more concentric ring structures displaced within the interior space, or one or more branching structures extending through at least a portion of the spine diameter, or one or more radial structures extending through at least a portion of the spine diameter, or one or more cavities.

21. The impact protection device of claim 14, wherein one or more flexible spines are either solid or hollow.

22. The impact protection device of claim 14, wherein one or more flexible spines have an elastic modulus of between about 1 GPa and about 10 GPa.

23. The impact protection device of claim 14, wherein one or more flexible spines have a length to width ratio of between about 5:1 and about 25:1.

24. The impact protection device of claim 14, wherein one or more flexible spines have either a pointed tapered edge or a rounded tapered edge.

25. The impact protection device of claim 14, wherein the flexible spines are packed on the device at a density of between about 1 to about 100 spines per square inch.

26. The impact protection device of claim 14, wherein the flexible spines are organized into an array and wherein the array is configured to have flexible spines selected from the group consisting of flexible spines having two different orientations, flexible spines having three different orientations, flexible spines having a repeating pattern of orientations, flexible spines having a random pattern of orientations, and flexible spines having a pseudorandom pattern of orientations.

\* \* \* \* \*